United States Patent
Khoury et al.

(10) Patent No.: US 12,525,244 B2
(45) Date of Patent: Jan. 13, 2026

(54) END-TO-END SPEAKER RECOGNITION USING DEEP NEURAL NETWORK

(71) Applicant: Pindrop Security, Inc., Atlanta, GA (US)

(72) Inventors: Elie Khoury, Atlanta, GA (US); Matthew Garland, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 18/422,523

(22) Filed: Jan. 25, 2024

(65) Prior Publication Data
US 2024/0249728 A1     Jul. 25, 2024

Related U.S. Application Data

(63) Continuation of application No. 17/963,091, filed on Oct. 10, 2022, which is a continuation of application
(Continued)

(51) Int. Cl.
| | | |
|---|---|---|
| *G10L 17/08* | (2013.01) | |
| *G06N 3/04* | (2023.01) | |

(Continued)

(52) U.S. Cl.
CPC ............... *G10L 17/08* (2013.01); *G06N 3/04* (2013.01); *G06N 3/08* (2013.01); *G10L 15/16* (2013.01);
(Continued)

(58) Field of Classification Search
CPC .......... G10L 17/08; G10L 15/16; G10L 17/02; G10L 17/04; G10L 17/18; G10L 17/22; G06N 3/04; G06N 3/08
(Continued)

(56) References Cited

U.S. PATENT DOCUMENTS

| | | |
|---|---|---|
| 4,817,156 A | 3/1989 | Bahl et al. |
| 4,829,577 A | 5/1989 | Kuroda et al. |

(Continued)

FOREIGN PATENT DOCUMENTS

| | | |
|---|---|---|
| JP | 2013-005205 A | 1/2013 |
| WO | WO-2015/079885 | 6/2015 |

(Continued)

OTHER PUBLICATIONS

Shun-ichi Amari, ("Backpropagation and stochastic gradient descent method") (Year: 1992).*

(Continued)

*Primary Examiner* — Paras D Shah
*Assistant Examiner* — Fouzia Hye Solaiman
(74) *Attorney, Agent, or Firm* — Foley & Lardner LLP

(57) ABSTRACT

The present invention is directed to a deep neural network (DNN) having a triplet network architecture, which is suitable to perform speaker recognition. In particular, the DNN includes three feed-forward neural networks, which are trained according to a batch process utilizing a cohort set of negative training samples. After each batch of training samples is processed, the DNN may be trained according to a loss function, e.g., utilizing a cosine measure of similarity between respective samples, along with positive and negative margins, to provide a robust representation of voiceprints.

20 Claims, 10 Drawing Sheets

Related U.S. Application Data

No. 16/536,293, filed on Aug. 8, 2019, now Pat. No. 11,468,901, which is a continuation of application No. 15/818,231, filed on Nov. 20, 2017, now Pat. No. 10,381,009, which is a continuation of application No. 15/262,748, filed on Sep. 12, 2016, now Pat. No. 9,824,692.

(51) Int. Cl.
| | |
|---|---|
| G06N 3/08 | (2023.01) |
| G10L 15/16 | (2006.01) |
| G10L 17/02 | (2013.01) |
| G10L 17/04 | (2013.01) |
| G10L 17/18 | (2013.01) |
| G10L 17/22 | (2013.01) |

(52) U.S. Cl.
CPC ............. *G10L 17/02* (2013.01); *G10L 17/04* (2013.01); *G10L 17/18* (2013.01); *G10L 17/22* (2013.01)

(58) Field of Classification Search
USPC ......................................................... 704/232
See application file for complete search history.

(56) References Cited

U.S. PATENT DOCUMENTS

| | | | |
|---|---|---|---|
| 4,972,485 A | 11/1990 | Dautrich et al. | |
| 5,072,452 A | 12/1991 | Brown et al. | |
| 5,461,697 A | 10/1995 | Nishimura et al. | |
| 5,475,792 A | 12/1995 | Stanford et al. | |
| 5,598,507 A | 1/1997 | Kimber et al. | |
| 5,659,662 A | 8/1997 | Wilcox et al. | |
| 5,835,890 A | 11/1998 | Matsui et al. | |
| 5,867,562 A | 2/1999 | Scherer | |
| 5,949,874 A | 9/1999 | Mark | |
| 5,995,927 A | 11/1999 | Li | |
| 6,009,392 A | 12/1999 | Kanevsky et al. | |
| 6,021,119 A | 2/2000 | Derks et al. | |
| 6,055,498 A | 4/2000 | Neumeyer et al. | |
| 6,094,632 A | 7/2000 | Hattori | |
| 6,141,644 A | 10/2000 | Kuhn et al. | |
| 6,411,930 B1 | 6/2002 | Burges | |
| 6,463,413 B1 | 10/2002 | Applebaum et al. | |
| 6,510,415 B1 | 1/2003 | Talmor et al. | |
| 6,519,561 B1 | 2/2003 | Farrell et al. | |
| 6,760,701 B2 | 7/2004 | Sharma et al. | |
| 6,882,972 B2 | 4/2005 | Kompe et al. | |
| 6,922,668 B1 | 7/2005 | Downey | |
| 6,975,708 B1 | 12/2005 | Scherer | |
| 7,003,460 B1 | 2/2006 | Bub et al. | |
| 7,209,881 B2 | 4/2007 | Yoshizawa et al. | |
| 7,295,970 B1 | 11/2007 | Gorin et al. | |
| 7,318,032 B1 | 1/2008 | Chaudhari et al. | |
| 7,324,941 B2 | 1/2008 | Choi et al. | |
| 7,739,114 B1 | 6/2010 | Chen et al. | |
| 7,813,927 B2 | 10/2010 | Navratil et al. | |
| 8,046,230 B1 | 10/2011 | Mcintosh | |
| 8,112,160 B2 | 2/2012 | Foster | |
| 8,160,811 B2 | 4/2012 | Prokhorov | |
| 8,160,877 B1 | 4/2012 | Nucci et al. | |
| 8,385,536 B2 | 2/2013 | Whitehead | |
| 8,484,023 B2 | 7/2013 | Kanevsky et al. | |
| 8,484,024 B2 | 7/2013 | Kanevsky et al. | |
| 8,554,563 B2 | 10/2013 | Aronowitz | |
| 8,712,760 B2 | 4/2014 | Hsia et al. | |
| 8,738,442 B1 | 5/2014 | Liu et al. | |
| 8,856,895 B2 | 10/2014 | Perrot | |
| 8,886,663 B2 | 11/2014 | Gainsboro et al. | |
| 8,903,859 B2 | 12/2014 | Zeppenfeld et al. | |
| 9,042,867 B2 * | 5/2015 | Gomar .................. | H04W 12/06 455/411 |
| 9,064,491 B2 * | 6/2015 | Rachevsky .......... | G06F 18/2411 |
| 9,237,232 B1 | 1/2016 | Williams et al. | |
| 9,277,049 B1 | 3/2016 | Danis | |
| 9,336,781 B2 | 5/2016 | Scheffer et al. | |
| 9,338,619 B2 | 5/2016 | Kang | |
| 9,343,067 B2 | 5/2016 | Ariyaeeinia et al. | |
| 9,344,892 B1 | 5/2016 | Rodrigues et al. | |
| 9,355,646 B2 | 5/2016 | Oh et al. | |
| 9,373,330 B2 | 6/2016 | Cumani et al. | |
| 9,401,143 B2 | 7/2016 | Senior et al. | |
| 9,401,148 B2 | 7/2016 | Lei et al. | |
| 9,406,298 B2 | 8/2016 | Cumani et al. | |
| 9,431,016 B2 * | 8/2016 | Aviles-Casco ........ | H04L 9/3231 |
| 9,444,839 B1 | 9/2016 | Faulkner et al. | |
| 9,454,958 B2 | 9/2016 | Li et al. | |
| 9,460,722 B2 | 10/2016 | Sidi et al. | |
| 9,466,292 B1 | 10/2016 | Lei et al. | |
| 9,502,038 B2 | 11/2016 | Wang et al. | |
| 9,514,753 B2 | 12/2016 | Sharifi et al. | |
| 9,558,755 B1 | 1/2017 | Laroche et al. | |
| 9,584,946 B1 | 2/2017 | Lyren et al. | |
| 9,620,145 B2 * | 4/2017 | Bacchiani ............... | G10L 25/30 |
| 9,626,971 B2 | 4/2017 | Rodriguez et al. | |
| 9,633,652 B2 | 4/2017 | Kurniawati et al. | |
| 9,641,954 B1 | 5/2017 | Typrin et al. | |
| 9,665,823 B2 | 5/2017 | Saon et al. | |
| 9,685,174 B2 | 6/2017 | Karam et al. | |
| 9,729,727 B1 | 8/2017 | Zhang | |
| 9,818,431 B2 | 11/2017 | Yu | |
| 9,824,692 B1 | 11/2017 | Khoury et al. | |
| 9,860,367 B1 | 1/2018 | Jiang et al. | |
| 9,875,739 B2 | 1/2018 | Ziv et al. | |
| 9,875,742 B2 | 1/2018 | Gorodetski et al. | |
| 9,875,743 B2 | 1/2018 | Gorodetski et al. | |
| 9,881,617 B2 | 1/2018 | Sidi et al. | |
| 9,930,088 B1 | 3/2018 | Hodge | |
| 9,984,706 B2 | 5/2018 | Wein | |
| 10,277,628 B1 | 4/2019 | Jakobsson | |
| 10,325,601 B2 | 6/2019 | Khoury et al. | |
| 10,347,256 B2 | 7/2019 | Khoury et al. | |
| 10,397,398 B2 | 8/2019 | Gupta | |
| 10,404,847 B1 | 9/2019 | Unger | |
| 10,462,292 B1 | 10/2019 | Stephens | |
| 10,506,088 B1 | 12/2019 | Singh | |
| 10,554,821 B1 | 2/2020 | Koster | |
| 10,630,682 B1 | 4/2020 | Bhattacharyya et al. | |
| 10,638,214 B1 | 4/2020 | Delhoume et al. | |
| 10,659,605 B1 | 5/2020 | Braundmeier et al. | |
| 10,679,630 B2 | 6/2020 | Khoury et al. | |
| 10,854,205 B2 | 12/2020 | Khoury et al. | |
| 11,069,352 B1 | 7/2021 | Tang et al. | |
| 11,659,082 B2 | 5/2023 | Gupta | |
| 2002/0095287 A1 | 7/2002 | Botterweck | |
| 2002/0143539 A1 | 10/2002 | Botterweck | |
| 2003/0231775 A1 | 12/2003 | Wark | |
| 2003/0236663 A1 | 12/2003 | Dimitrova et al. | |
| 2004/0218751 A1 | 11/2004 | Colson et al. | |
| 2004/0230420 A1 | 11/2004 | Kadambe et al. | |
| 2005/0038655 A1 | 2/2005 | Mutel et al. | |
| 2005/0039056 A1 | 2/2005 | Bagga et al. | |
| 2005/0286688 A1 | 12/2005 | Scherer | |
| 2006/0058998 A1 | 3/2006 | Yamamoto et al. | |
| 2006/0111905 A1 | 5/2006 | Navratil et al. | |
| 2006/0293771 A1 | 12/2006 | Tazine et al. | |
| 2007/0189479 A1 | 8/2007 | Scherer | |
| 2007/0198257 A1 | 8/2007 | Zhang et al. | |
| 2007/0294083 A1 | 12/2007 | Bellegarda et al. | |
| 2008/0195389 A1 | 8/2008 | Zhang et al. | |
| 2008/0312926 A1 | 12/2008 | Vair et al. | |
| 2009/0138712 A1 | 5/2009 | Driscoll | |
| 2009/0265328 A1 | 10/2009 | Parekh et al. | |
| 2010/0131273 A1 | 5/2010 | Aley-Raz et al. | |
| 2010/0217589 A1 | 8/2010 | Gruhn et al. | |
| 2010/0232619 A1 | 9/2010 | Uhle et al. | |
| 2010/0262423 A1 | 10/2010 | Huo et al. | |
| 2011/0010173 A1 | 1/2011 | Scott et al. | |
| 2012/0173239 A1 | 7/2012 | Asenjo et al. | |
| 2012/0185418 A1 | 7/2012 | Capman et al. | |
| 2013/0041660 A1 | 2/2013 | Waite | |
| 2013/0080165 A1 | 3/2013 | Wang et al. | |

(56) References Cited

U.S. PATENT DOCUMENTS

| | | |
|---|---|---|
| 2013/0109358 A1 | 5/2013 | Balasubramaniyan et al. |
| 2013/0300939 A1 | 11/2013 | Chou et al. |
| 2014/0046878 A1 | 2/2014 | Lecomte et al. |
| 2014/0053247 A1 | 2/2014 | Fadel |
| 2014/0081640 A1 | 3/2014 | Farrell et al. |
| 2014/0136194 A1* | 5/2014 | Warford .................. G10L 25/51 704/233 |
| 2014/0195236 A1 | 7/2014 | Hosom et al. |
| 2014/0214417 A1 | 7/2014 | Wang et al. |
| 2014/0214676 A1 | 7/2014 | Bukai |
| 2014/0241513 A1 | 8/2014 | Springer |
| 2014/0250512 A1 | 9/2014 | Goldstone et al. |
| 2014/0278412 A1 | 9/2014 | Scheffer et al. |
| 2014/0288928 A1 | 9/2014 | Penn et al. |
| 2014/0337017 A1 | 11/2014 | Watanabe et al. |
| 2015/0036813 A1 | 2/2015 | Ananthakrishnan et al. |
| 2015/0127336 A1 | 5/2015 | Lei et al. |
| 2015/0149165 A1 | 5/2015 | Saon |
| 2015/0161522 A1 | 6/2015 | Saon et al. |
| 2015/0189086 A1 | 7/2015 | Romano et al. |
| 2015/0199960 A1 | 7/2015 | Huo et al. |
| 2015/0269931 A1 | 9/2015 | Senior et al. |
| 2015/0269941 A1 | 9/2015 | Jones |
| 2015/0310008 A1 | 10/2015 | Thudor et al. |
| 2015/0334231 A1 | 11/2015 | Rybak et al. |
| 2015/0348571 A1 | 12/2015 | Koshinaka et al. |
| 2015/0356630 A1 | 12/2015 | Hussain |
| 2015/0365530 A1 | 12/2015 | Kolbegger et al. |
| 2016/0019458 A1 | 1/2016 | Kaufhold |
| 2016/0019883 A1 | 1/2016 | Aronowitz |
| 2016/0028434 A1 | 1/2016 | Kerpez et al. |
| 2016/0048846 A1 | 2/2016 | Douglas et al. |
| 2016/0078863 A1 | 3/2016 | Chung et al. |
| 2016/0104480 A1 | 4/2016 | Sharifi |
| 2016/0125877 A1 | 5/2016 | Foerster et al. |
| 2016/0180214 A1 | 6/2016 | Kanevsky et al. |
| 2016/0189707 A1 | 6/2016 | Donjon et al. |
| 2016/0240190 A1 | 8/2016 | Lee et al. |
| 2016/0275953 A1 | 9/2016 | Sharifi et al. |
| 2016/0284346 A1 | 9/2016 | Visser et al. |
| 2016/0293167 A1* | 10/2016 | Chen ................ H04N 21/23406 |
| 2016/0314790 A1 | 10/2016 | Tsujikawa et al. |
| 2016/0343373 A1 | 11/2016 | Ziv et al. |
| 2017/0060779 A1 | 3/2017 | Falk |
| 2017/0069313 A1 | 3/2017 | Aronowitz |
| 2017/0069327 A1* | 3/2017 | Heigold .................. G10L 17/02 |
| 2017/0098444 A1 | 4/2017 | Song |
| 2017/0111515 A1 | 4/2017 | Bandyopadhyay et al. |
| 2017/0126884 A1 | 5/2017 | Balasubramaniyan et al. |
| 2017/0142150 A1 | 5/2017 | Sandke et al. |
| 2017/0169816 A1 | 6/2017 | Blandin et al. |
| 2017/0230390 A1 | 8/2017 | Faulkner et al. |
| 2017/0262837 A1 | 9/2017 | Gosalia |
| 2018/0082691 A1 | 3/2018 | Khoury et al. |
| 2018/0152558 A1 | 5/2018 | Chan et al. |
| 2018/0249006 A1 | 8/2018 | Dowlatkhah et al. |
| 2018/0268023 A1 | 9/2018 | Korpusik et al. |
| 2018/0295235 A1 | 10/2018 | Tatourian et al. |
| 2018/0337962 A1 | 11/2018 | Ly et al. |
| 2019/0037081 A1 | 1/2019 | Rao et al. |
| 2019/0172476 A1 | 6/2019 | Wung et al. |
| 2019/0174000 A1 | 6/2019 | Bharrat et al. |
| 2019/0180758 A1 | 6/2019 | Washio |
| 2019/0238956 A1 | 8/2019 | Gaubitch et al. |
| 2019/0297503 A1 | 9/2019 | Traynor et al. |
| 2020/0035224 A1 | 1/2020 | Ward et al. |
| 2020/0137221 A1 | 4/2020 | Dellostritto et al. |
| 2020/0195779 A1 | 6/2020 | Weisman et al. |
| 2020/0252510 A1 | 8/2020 | Ghuge et al. |
| 2020/0312313 A1 | 10/2020 | Maddali et al. |
| 2020/0396332 A1 | 12/2020 | Gayaldo |
| 2021/0084147 A1 | 3/2021 | Kent et al. |
| 2021/0150010 A1 | 5/2021 | Strong et al. |

FOREIGN PATENT DOCUMENTS

| | | |
|---|---|---|
| WO | WO-2016/195261 A1 | 12/2016 |
| WO | WO-2017/167900 A1 | 10/2017 |

OTHER PUBLICATIONS

Samy Bengio, Word Embeddings for Speech Recognition (Year: 2014).*
Hoffer et al. (Deep Metric Learning Using Triplet Network) (Year: 2015).*
Richardson et al. ("Deep Neural Network Approaches to Speaker and Language Recognition"). (Year: 2015).*
Anonymous: "Filter bank—Wikipedia", Apr. 3, 2024 (Apr. 3, 2024), XP093147551, Retrieved from the Internet: URL:https://en.wikipedia.org/wiki/Filter_bank [retrieved on Apr. 3, 2024].
Database Inspec [Online] The Institution of Electrical Engineers, Stevenage, GB; Sep. 10, 2015 (Sep. 10, 2015), Majeed SA et al: "Mel Frequency Cepstral Coefficients (MFCC) Feature Extraction Enhancement In The Application Of Speech Recognition: A Comparison Study", Database accession No. 15842570 ; & Journal of Theoretical and Applied Information Technology JATIT Pakistan, vol. 79, No. 1 , pp. 38-56, ISSN: 1992-8645.
Examiner's Report on EPO App. 20786776.3 dated Apr. 12, 2024 (6 pages).
Sivakuntaran P et al: "The use of sub-band cepstrum in speaker verification", Acoustics, Speech, and Signal Processing, 2000. ICASSP '00. Proceedings. 2000 IEEE International Conference on Jun. 5-9, 2000, Piscataway, NJ, USA,IEEE, vol. 2, Jun. 5, 2000 (Jun. 5, 2000), pp. 1073-1076, XP010504912, ISBN: 978-0-7803-6293-2.
Office Action from the Japanese Office Action on App. 2022-104204 dated Jan. 6, 2024 (6 pages).
Notice of Refusal Office Action issued in Japanese Application No. 2022-104204 dated Sep. 19, 2024 (4 Pages).
Office Action issued in Japanese Patent Application No. 2025-003657 dated Oct. 22, 2025.
Ahmad et al., "A Unique Approach in Text Independent Speaker Recognition using MFCC Feature Sets and Probabilistic Neural Network", Eighth International Conference on Advances in Pattern Recognition (ICAPR}, IEEE, 2015 (6 pages).
Almaadeed, et al., "Speaker identification using multimodal neural networks and wavelet analysis," IET Biometrics 4.1 (2015), 18-28.
Atrey, et al., "Audio based event detection for multimedia surveillance", Acoustics, Speech and Signal Processing, 2006, ICASSP 2006 Proceedings, 2006 IEEE International Conference on vol. 5, IEEE, 2006. pp. 813-816.
Australian Examination Report on AU Appl. Ser. No. 2020271801 dated Jul. 25, 2022 (4 pages).
Baraniuk, "Compressive Sensing [Lecture Notes]", IEEE Signal Processing Magazine, vol. 24, Jul. 2007, 4 pages.
Bredin, "TristouNet: Triplet Loss for Speaker Turn Embedding", Arxiv.org, Cornell University Library, 201 Olin Library Cornell University Ithaca, NY 14853, Sep. 14, 2016, XP080726602.
Buera et al., "Unsupervised Data-Driven Feature Vector Normalization With Acoustic Model Adaptation for Robust Speech Recognition", IEEE Transactions on Audio, Speech, and Language Processing, vol. 18, No. 2, Feb. 2010, pp. 296-309 (14 pages).
Campbell, "Using Deep Belief Networks for Vector-Based Speaker Recognition", Proceedings of Interspeech 2014, Sep. 14, 2014, pp. 676-680, XP055433784.
Castaldo et al., "Compensation of Nuisance Factors for Speaker and Language Recognition," IEEE Transactions on Audio, Speech and Language Processing, ieeexplore.ieee.org, vol. 15, No. 7, Sep. 2007. pp. 1969-1978.
Chen et al., "Res Net and Model Fusion for Automatic Spoofing Detection." Interspeech. (Year: 2017).
Communication pursuant to Article 94(3) EPC issued in EP Application No. 17 772 184.2-1207 dated Jul. 19, 2019.
Communication pursuant to Article 94(3) EPC on EP 17772184.2 dated Jun. 18, 2020.

(56) References Cited

OTHER PUBLICATIONS

Cumani, et al., "Factorized Sub-space Estimation for Fast and Memory Effective I-Vector Extraction", IEEE/ACM TASLP, vol. 22, Issue 1, Jan. 2014, 28 pages.
D.Etter and C.Domniconi, "Multi2Rank: Multimedia Multiview Ranking," 2015 IEEE International Conference on Multimedia Big Data, 2015, pp. 80-87. (Year 2015).
Dehak, et al., "Front-End Factor Analysis for Speaker Verification", IEEE Transactions on Audio, Speech, and Language Processing, vol. 19, No. 4, May 2011, pp. 788-798.
Dinkel et al., "End-to-end spoofing detection with raw waveform CLDNNS." 2017 IEEE International Conference on Acoustics, Speech and Signal Processing (ICASSP). IEEE (Year: 2017).
Douglas A. Reynolds et al., "Speaker Verification Using Adapted Gaussian Mixture Models," Digital Signal Processing 10, 2000, pp. 19-41.
Examination Report for EP 17778046.7 dated Jun. 16, 2020 (4 pages).
Examination Report for IN 201947014575 dated Nov. 16, 2021 (6 pages).
Examination Report No. 1 for AU 2017322591 dated Jul. 16, 2021 (2 pages).
Final Office Action for U.S. Appl. No. 16/200,283 dated Jun. 11, 2020 (15 pages).
Final Office Action for U.S. Appl. No. 16/784,071 dated Oct. 27, 2020 (12 pages).
Final Office Action on U.S. Appl. No. 15/872,639 dated Jan. 29, 2019 (11 pages).
Final Office Action on U.S. Appl. No. 16/829,705 dated Mar. 24, 2022 (23 pages).
First Examiner's Requisition for CA App. 3,135,210 dated Oct. 5, 2023 (5 pages).
First Examiners Requisition on CA Appl. 3,096,378 dated Jun. 12, 2023 (3 pages).
First Office Action issued in KR 10-2019-7010-7010208 dated Jun. 29, 2019. (5 pages).
First Office Action issued on CA Application No. 3,036,533 dated Apr. 12, 2019. (4 pages).
First Office Action on CA Application No. 3,075,049 dated May 7, 2020. (3 pages).
Florian et al., "FaceNet: A unified embedding for face recognition and clustering", 2015 IEEE Conference on Computer Vision and Pattern Recognition (CVPR), IEEE, Jun. 7, 2015, pp. 815-823, XP032793492, DOI: 10.1109/CVPR.2015.7298682.
Foreign Action on JP 2019-535198 dated Mar. 1, 2022 (6 pages).
Fu et al., "SNR-Aware Convolutional Neural Network Modeling for Speech Enhancement", Interspeech 2016, Sep. 8-12, 2016, pp. 3768-3772, XP055427533, ISSN: 1990-9772, DOI: 10.21437/Interspeech.2016-211 (5 pages).
Gao, et al., "Dimensionality reduction via compressive sensing", Pattern Recognition Letters 33, Elsevier Science BV 0167-8655, 2012. 8 pages.
Garcia-Romero et al., "Unsupervised Domain Adaptation for I-Vector Speaker Recgonition" Odyssey 2014, pp. 260-264.
Ghahabi Omid et al., "Restricted Boltzmann Machine Supervectors for Speaker Recognition", 2015 IEEE International Conference on acoustics, Speech and Signal Processing (ICASSP), IEEE, Apr. 19, 2015, XP033187673, pp. 4804-4808 (5 pages).
Gish, et al., "Segregation of Speakers for Speech Recognition and Speaker Identification", Acoustics, Speech, and Signal Processing, 1991, ICASSP-91, 1991 International Conference on IEEE, 1991. pp. 873-876.
Hoffer et al., "Deep Metric Learning Using Triplet Network", 2015, arXiv: 1412.6622v3, retrieved Oct. 4, 2021 from URL: https://deepsense.ai/wp-content/uploads/2017/08/1412.6622-3.pdf (8 pages).
Hoffer et al., "Deep Metric Learning Using Triplet Network," ICLR 2015 (workshop contribution), Mar. 23, 2015, pp. 1-8.
Huang, et al., "A Blind Segmentation Approach to Acoustic Event Detection Based on I-Vector", Interspeech, 2013. pp. 2282-2286.
Information Disclosure Statement filed Aug. 8, 2019.

Information Disclosure Statement filed Feb. 12, 2020 (4 pages).
International Preliminary Report on Patentability for PCT/US2020/017051 dated Aug. 19, 2021 (11 pages).
International Preliminary Report on Patentability, Ch. I, for PCT/US2017/039697 dated Jan. 1, 2019 (10 pages).
International Preliminary Report on Patentability, Ch. I, for PCT/US2017/052293 dated Mar. 19, 2019 (8 pages).
International Preliminary Report on Patentability, Ch. I, for PCT/US2017/052316 dated Mar. 19, 2019 (7 pages).
International Preliminary Report on Patentability, Ch. I, for PCT/US2017/052335 dated Mar. 19, 2019 (8 pages).
International Preliminary Report on Patentability, Ch. I, for PCT/US2020/026992 dated Oct. 21, 2021 (10 pages).
International Search Report and Written Opinion for PCT/US20/17051 dated Apr. 23, 2020 (12 pages).
International Search Report and Written Opinion for PCT/US2017/052335 dated Dec. 8, 2017 (10 pages).
International Search Report and Written Opinion for PCT/US2020/24709 dated Jun. 19, 2020 (10 pages).
International Search Report and Written Opinion issued in corresponding International Application No. PCT/US2018/013965 with Date of mailing May 14, 2018.
International Search Report and Written Opinion issued in International Application No. PCT/US20/26992 with Date of mailing Jun. 26, 2020.
International Search Report and Written Opinion issued in the corresponding International Application No. PCT/US2017/039697, mailed on Sep. 20, 2017. 17 pages.
International Search Report and Written Opinion of the International Searching Authority issued in corresponding International Application No. PCT/US2017/050927 with Date of mailing Dec. 11, 2017.
International Search Report and Written Opinion on PCT Appl. Ser. No. PCT/US2020/026992 dated Jun. 26, 2020 (11 pages).
International Search Report issued in corresponding International Application No. PCT/US2017/052293 dated Dec. 21, 2017.
International Search Report issued in corresponding International Application No. PCT/US2017/052316 with Date of mailing Dec. 21, 2017. 3 pages.
Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].
Kenny, "A Small Footprint i-Vector Extractor" Proc. Odyssey Speaker and Language Recognition Workshop, Singapore, Jun. 25, 2012. 6 pages.
Khoury et al., "Combining Transcription-Based and Acoustic-Basedd Speaker Identifications for Broadcast News", ICASSP, Kyoto, Japan, 2012, pp. 4377-4380.
Khoury, et al., "Improvised Speaker Diariztion System for Meetings", Acoustics, Speech and Signal Processing, 2009, ICASSP 2009, IEEE International Conference on IEEE, 2009. pp. 4097-4100.
Kockmann et al., "Syllable based Feature-Contours for Speaker Recognition," Proc. 14th International Workshop on Advances, 2008. 4 pages.
Korean Office Action (with English summary), dated Jun. 29, 2019, issued in Korean application No. 10-2019-7010208, 6 pages.
Lei et al., "A Novel Scheme for Speaker Recognition Using a Phonetically-aware Deep Neural Network", Proceedings on ICASSP, Florence, Italy, IEEE Press, 2014, pp. 1695-1699.
Luque, et al., "Clustering Initialization Based on Spatial Information for Speaker Diarization of Meetings", Ninth Annual Conference of the International Speech Communication Association, 2008. pp. 383-386.
McLaren, et al., "Advances in deep neural network approaches to speaker recognition," In Proc. 40th IEEE International Conference on Acoustics, Speech and Signal Processing (ICASSP), 2015.
Mclaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.

(56) References Cited

OTHER PUBLICATIONS

Meignier, et al., "Lium Spkdiarization: An Open Source Toolkit for Diarization" CMU SPUD Workshop, 2010. 7 pages.
Non-Final Office Action for U.S. Appl. No. 15/709,232 dated Jun. 27, 2019 (11 pages).
Non-Final Office Action for U.S. Appl. No. 15/709,232 dated Oct. 5, 2018 (21 pages).
Non-Final Office Action for U.S. Appl. No. 15/709,290 dated Oct. 5, 2018 (12 pages).
Non-Final Office Action for U.S. Appl. No. 16/200,283 dated Jan. 7, 2020 (10 pages).
Non-Final Office Action for U.S. Appl. No. 16/442,368 dated Oct. 4, 2019 (10 pages).
Non-Final Office Action for U.S. Appl. No. 16/784,071 dated May 12, 2020 (10 pages).
Non-Final Office Action for U.S. Appl. No. 16/829,705 dated Nov. 10, 2021 (20 pages).
Non-Final Office Action on U.S. Appl. No. 15/610,378 dated Mar. 1, 2018 (11 pages).
Non-Final Office Action on U.S. Appl. No. 16/551,327 dated Dec. 9, 2019 (7 pages).
Non-Final Office Action on U.S. Appl. No. 15/872,639 dated Aug. 23, 2018 (10 pages).
Non-Final Office Action on U.S. Appl. No. 16/829,705 dated Jul. 21, 2022 (27 pages).
Non-Final Office Action on U.S. Appl. No. 16/983,967 dated Jun. 30, 2022 (11 pages).
Notice of Allowance for U.S. Appl. No. 15/610,378 dated Aug. 7, 2018 (5 pages).
Notice of Allowance for U.S. Appl. No. 15/709,024 dated Mar. 18, 2019 (11 pages).
Notice of Allowance for U.S. Appl. No. 15/709,232 dated Feb. 6, 2019 (11 pages).
Notice of Allowance for U.S. Appl. No. 15/709,232 dated Oct. 8, 2019 (11 pages).
Notice of Allowance for U.S. Appl. No. 15/709,290 dated Feb. 6, 2019 (6 pages).
Notice of Allowance for U.S. Appl. No. 16/200,283 dated Aug. 24, 2020 (7 pages).
Notice of Allowance for U.S. Appl. No. 16/442,368 dated Feb. 5, 2020 (7 pages).
Notice of Allowance for U.S. Appl. No. 16/505,452 dated Jul. 23, 2020 (8 pages).
Notice of Allowance for U.S. Appl. No. 16/505,452 dated May 13, 2020 (9 pages).
Notice of Allowance for U.S. Appl. No. 16/784,071 dated Jan. 27, 2021 (14 pages).
Notice of Allowance for U.S. Appl. No. 17/317,575 dated Jan. 28, 2022 (11 pages).
Notice of Allowance on U.S. Appl. No. 15/262,748 dated Sep. 13, 2017 (9 pages).
Notice of Allowance on U.S. Appl. No. 15/818,231 dated Mar. 27, 2019 (9 pages).
Notice of Allowance on U.S. Appl. No. 15/872,639 dated Apr. 25, 2019 (5 pages).
Notice of Allowance on U.S. Appl. No. 16/551,327 dated Mar. 26, 2020.
Notice of Allowance on U.S. Appl. No. 17/107,496 dated Jan. 26, 2023 (8 pages).
Notice of Allowance on U.S. Appl. No. 16/536,293 dated Jun. 3, 2022 (9 pages).
Notification of Transmittal of the International Search Report and the Written Opinion of the International Searching Authority, mailed May 14, 2018, in corresponding International Application No. PCT/US2018/013965, 13 pages.
Novoselov, et al., "SIC Speaker Recognition System for the NIST i-Vector Challenge." Odyssey: The Speaker and Language Recognition Workshop. Jun. 16-19, 2014. pp. 231-240.
Office Action for CA 3036561 dated Jan. 23, 2020 (5 pages).
Office Action on Japanese Application 2022-104204 dated Jul. 26, 2023 (4 pages).
Oguzhan et al., "Recognition of Acoustic Events Using Deep Neural Networks", 2014 22nd European Signal Processing Conference (EUSiPCO), Sep. 1, 2014, pp. 506-510 (5 pages).
Piegeon, et al., "Applying Logistic Regression to the Fusion of the NIST'99 1-Speaker Submissions", Digital Signal Processing Oct. 1-3, 2000. pp. 237-248.
Prazak et al., "Speaker Diarization Using PLDA-based Speaker Clustering", The 6th IEEE International Conference on Intelligent Data Acquisition and Advanced Computing Systems: Technology and Applications, Sep. 2011, pp. 347-350 (4 pages).
Prince, et al., "Probabilistic Linear Discriminant Analysis for Inferences About Identity," Proceedings of the International Conference on Computer Vision, Oct. 14-21, 2007. 8 pages.
Ravanelli et al., "Speaker recognition from raw waveform with sincnet." 2018 IEEE spoken language technology workshop (SLT). IEEE (Year: 2018).
Reasons for Refusal for JP 2019-535198 dated Sep. 10, 2021 (7 pages).
Reynolds et al., "Speaker Verification Using Adapted Gaussian Mixture Models," Digital Signal Processing 10, 2000, pp. 19-41.
Richardson, et al., "Channel Compensation for Speaker Recognition using MAP Adapted PLDA and Denoising DNNs", Proc. Speaker Lang. Recognit. Workshop, Jun. 22, 2016, pp. 225-230.
Richardson, et al., "Deep Neural Network Approaches to Speaker and Language Recognition", IEEE Signal Processing Letters, vol. 22, No. 10, Oct. 2015, pp. 1671-1675.
Richardson, et al., "Speaker Recognition Using Real vs Synthetic Parallel Data for DNN Channel Compensation", Interspeech, 2016. 6 pages.
Richardson, et al., Speaker Recognition Using Real vs Synthetic Parallel Data for DNN Channel Compensation, Interspeech, 2016, retrieved Sep. 14, 2021 from URL: https://www.ll.mit.edu/sites/default/files/publication/doc/2018-05/2016-Richardson-Interspeech.pdf (6 pages).
Rouvier et al., "An Open-source State-of-the-art Toolbox for Broadcast News Diarization", Interspeech, Aug. 2013, pp. 1477-1481 (5 pages).
Scheffer et al., "Content matching for short duration speaker recognition", Interspeech, Sep. 14-18, 2014, pp. 1317-1321.
Schmidt et al., "Large-Scale Speaker Identification" ICASSP, 2014, pp. 1650-1654.
Seddik, et al., "Text independent speaker recognition using the Mel frequency cepstral coefficients and a neural network classifier." First International Symposium on Control, Communications and Signal Processing, 2004. IEEE, 2004.
Shajeesh, et al., "Speech Enhancement based on Savitzky-Golay Smoothing Filter", International Journal of Computer Applications, vol. 57, No. 21, Nov. 2012, pp. 39-44 (6 pages).
Shum et al., "Exploiting Intra-Conversation Variability for Speaker Diarization", Interspeech, Aug. 2011, pp. 945-948 (4 pages).
Snyder et al., "Time Delay Deep Nueral Network-Based Universal Background Models for Speaker Recognition", IEEE Workshop on Automatic Speech Recognition and Understanding (ASRU), 2015, pp. 92-97 (6 pages).
Solomonoff, et al., "Nuisance Attribute Projection", Speech Communication, Elsevier Science BV, Amsterdam, The Netherlands, May 1, 2007. 74 pages.
Sturim et al., "Speaker Linking and Applications Using Nonparametric Hashing Methods," Interspeech, Sep. 2016, 5 pages.
Summons to attend oral proceedings pursuant to Rule 115(1) EPC issued in EP Application No. 17 772 184.2-1207 dated Dec. 16, 2019.
T.C.Nagavi, S.B. Anusha, P.Monisha and S.P.Poomima, "Content based audio retrieval with MFCC feature extraction, clustering and sort-merge techniquest," 2013 Fourth International Conference on Computing, Communications and Networking Technologies (ICCCNT), 2013, pp. 1-6. (Year 2013).
Temko, et al., "Acoustic event detection in meeting-room environments", Pattern Recognition Letters, vol. 30, No. 14, 2009, pp. 1281-1288.

(56) References Cited

OTHER PUBLICATIONS

Temko, et al., "Classification of acoustic events using SVM-based clustering schemes", Pattern Recognition, vol. 39, No. 4, 2006, pp. 682-694.

US Non Final Office Action on U.S. Appl. No. 17/107,496 dated Jul. 21, 2022 (7 pages).

US Notice of Allowance on U.S. Appl. No. 17/107,496 dated Sep. 28, 2022 (8 pages).

Uzan et al., "I Know That Voice: Identifying the Voice Actor Behind the Voice", 2015 International Conference on Biometrics (ICB), 2015, retrieved Oct. 4, 2021 from URL: https://citeseerx.ist.psu.edu/viewdoc/download?doi=10.1.1.715.8031&rep=rep1&type=pdf (6 pages).

Variani et al., "Deep neural networks for small footprint text-dependent speaker verification", 2014 IEEE International Conference On Acoustics, Speech and Signal Processing (ICASSP), IEEE, May 4, 2014, pp. 4052-4056, XP032617560, DOI: 10.1109/ICASSP.2014.6854363 [retrieved on Jul. 11, 2014].

Vella et al., "Artificial neural network features for speaker diarization", 2014 IEEE Spoken Language Technology Workshop (SLT), IEEE Dec. 7, 2014, pp. 402-406, XP032756972, DOI: 10.1109/SLT.2014.7078608.

Wang et al., "Learning Fine-Grained Image Similarity with Deep Ranking", Computer Vision and Pattern Recognition, Jan. 17, 2014, arXiv: 1404.4661v1, retrieved Oct. 4, 2021 from URL: https://arxiv.org/pdf/1404.4661.pdf (8 pages).

Xiang, et al., "Efficient text-independent speaker verification with structural Gaussian mixture models and neural network." IEEE Transactions on Speech and Audio Processing 11.5 (2003): 447-456.

Xu et al., "Rapid Computation of I-Vector" Odyssey, Bilbao, Spain, Jun. 21-24, 2016. 6 pages.

Xue et al., "Fast Query by Example of Enviornmental Sounds Via Robust and Efficient Cluster-Based Indexing", Acoustics, Speech and Signal Processing (ICASSP), IEEE, 2008, pp. 5-8 (4 pages).

Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/fe6e53e65bced5736480afe34b6c16728408.pdf [retrieved on Sep. 25, 2017].

Yella Sree Harsha et al., "Artificial neural network features for speaker diarization", 2014 IEEE Spoken Language technology Workshop (SLT), IEEE, Dec. 7, 2014, pp. 402-406, XP032756972, DOI: 10.1109/SLT.2014.7078608.

Zhang et al., "Extracting Deep Neural Network Bottleneck Features Using Low-Rank Matrix Factorization", IEEE, ICASSP, 2014. 5 pages.

Zheng, et al., "An Experimental Study of Speech Emotion Recognition Based on Deep Convolutional Neural Networks", 2015 International Conference on Affective Computing and Intelligent Interaction (ACII), 2015, pp. 827-831 (5 pages).

\* cited by examiner

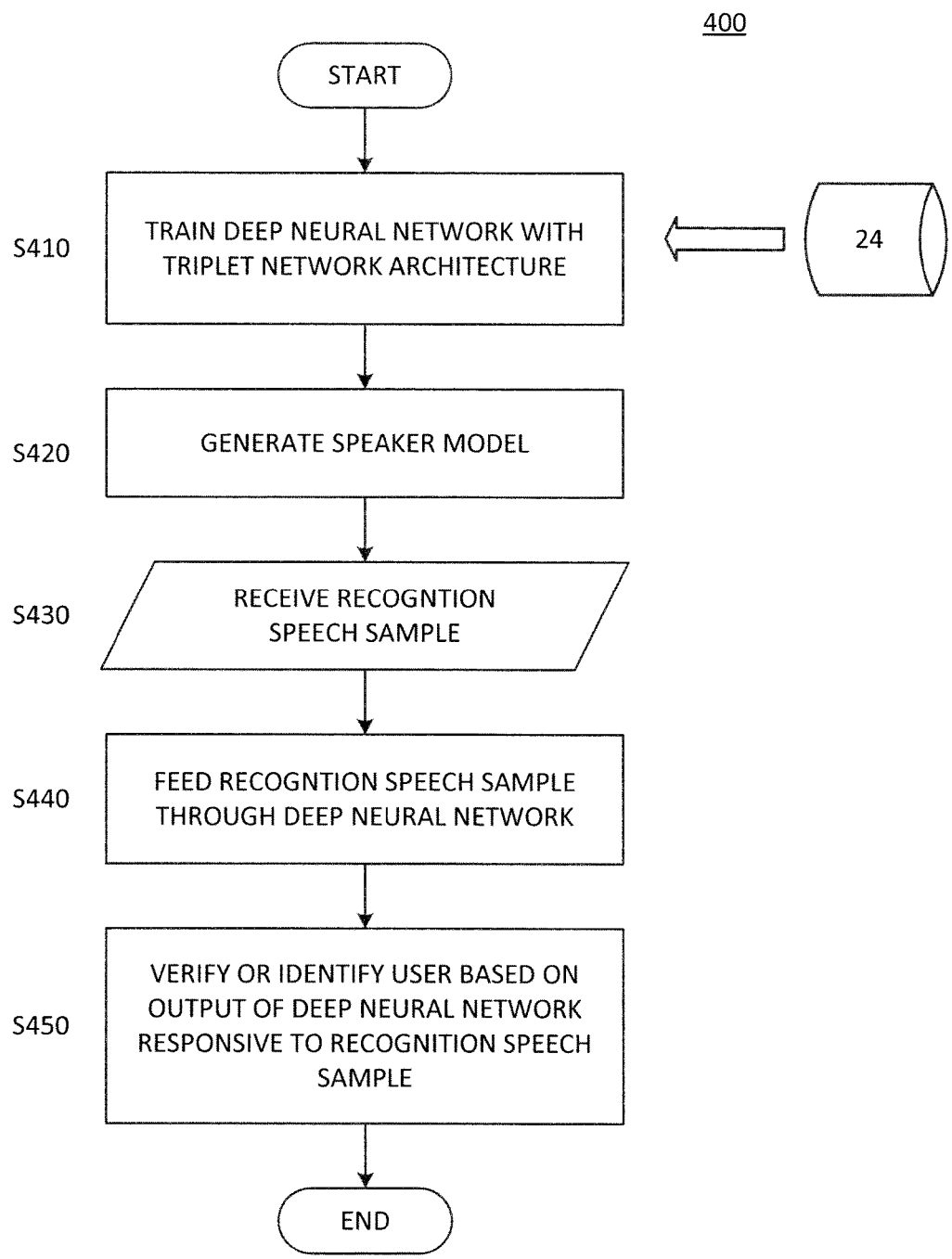

END-TO-END SPEAKER RECOGNITION USING DEEP NEURAL NETWORK

CROSS-REFERENCE TO RELATED APPLICATIONS

This application is a continuation of U.S. patent application Ser. No. 17/963,091, filed Oct. 10, 2022, which is a continuation of U.S. patent application Ser. No. 16/536,293, filed Aug. 8, 2019, which is a continuation of U.S. patent application Ser. No. 15/818,231, filed Nov. 20, 2017, which is a continuation of U.S. patent application Ser. No. 15/262,748, filed Sep. 12, 2016, each of which is incorporated by reference in its entirety.

TECHNICAL FIELD

The present invention is directed to voice recognition including speaker verification and/or identification of the speaker. Further, the present invention may be used to conduct text-independent speaker recognition.

BACKGROUND

Current state-of-the art approaches to speaker recognition are based on a universal background model (UBM) estimated using either acoustic Gaussian mixture modeling (GMM) (see Douglas A. Reynolds et al., "Speaker Verification Using Adapted Gaussian Mixture Models," Digital Signal Processing, 2000, the entire contents of which are herein incorporated by reference) or phonetically-aware deep neural network architecture (see Y. Lei et al., "A Novel Scheme for Speaker Recognition Using a Phonetically-Aware Deep Neural Network," Proceedings of ICASSP 2014, the entire contents of which are herein incorporate by reference). The most successful techniques consist of adapting the UBM model to every speech utterance using the total variability paradigm (see N. Dehak et al., "Front-End Factor Analysis for Speaker Verification," IEEE Transactions on Audio, Speech, and Language Processing, Vol. 19, No. 4, pp. 788-798, May 2011, the entire contents of which are herein incorporated by reference). The total variability paradigm aims to extract a low-dimensional feature vector known as an "i-vector" that preserves the total information about the speaker and the channel. After applying channel compensation technique, the resulting i-vector can be considered a voiceprint or voice signature of the speaker.

The main drawback of such approaches is that, by only using handcrafted features designed to reproduce the human perception system, they tend to discard useful information that is important to recognize or verify speakers. Typically, the aforementioned approaches utilize low-level features, such as Mel Frequency Cepstrum Coefficients (MFCCs), and attempt to fit them to a fixed number of Gaussian distributions (typically 1024 or 2048 Gaussians). This makes it difficult to model complex structures in a feature space where the Gaussian assumption does not necessary hold.

SUMMARY

The present invention is directed to a system that utilizes a deep neural network with a triplet network architecture to train a front-end feature extractor, which is used to perform a task of verification of a speaker's identity or identifying a speaker among a closed set of known speakers.

According to an exemplary embodiment, the system is comprised of a memory device and a processor-based device. The memory device stores speech samples which include: dual sets of speech samples attributed to the same speaker, a cohort set of speech samples not attributed to the same speaker as the dual sets, and a set of speaker models. Further, the processor-based device is configured to model a deep neural network with a triplet network architecture. The processor-based device trains the deep neural network according to a batch process in which the dual sets of speech samples are fed through the deep neural network in combination with the cohort set of speech samples.

According to a further exemplary embodiment, the deep neural network may include a first feed-forward neural network which receives and processes a first input to produce a first network output, a second feed-forward neural network which receives and processes a second input to produce a second network output, and a third feed-forward neural network which receives and processes a third input to produce a third network output. Also, for each of a plurality of speakers, the memory device includes a first set of P speech samples $x_1, \ldots, x_p$ attributed to the speaker and a second set of P speech samples $(x_1^+, \ldots, x_p^+)$ attributed to the speaker, with P being an integer greater than or equal to 2. The deep neural network is trained by the processor-based device such that, for each of the plurality of speakers, the deep neural network performs a batch processing during which the corresponding first set of speech samples are fed through the first feed-forward neural network, the corresponding second set of speech samples are fed through the second feed-forward neural network, and the cohort set of speech samples are fed through the third feed-forward neural network, upon completion of the batch processing, a loss function is computed based on the first network outputs, the second network outputs, and the third network outputs obtained based respectively on the corresponding first set of speech samples, the corresponding second set of speech samples, and the cohort set of speech samples. The computed loss function is used to modify connection weights in each of the first, second, and third feed-forward neural networks according to a back propagation technique.

According to a further exemplary embodiment, the aforementioned loss function may be based on: a positive distance $d_+$ corresponding to a degree of similarity $S_+$ between the first network output responsive to one of the first set of speech samples $x_i$ and the second network output responsive to a corresponding one of the second set of speech samples $x_i^+$, and a negative distance $d_-$ corresponding to a degree of similarity $S_-$ between the first network output responsive to the one of the first set of speech samples $x_i$ and a most similar one of the third network outputs responsive to respective speech samples of the cohort set. Further, the positive distance $d_+$ and the negative distance $d_-$ may be determined by applying different respective margins $M_+$, $M_-$ to the corresponding degrees of similarity $S_+$, $S_-$. In particular, the loss function may be defined as $$\text{Loss} = \sum_{i=1}^{p} L(x_i, x_i^+, X^-),$$

where $$L(x_i, x_i^+) = K \frac{e^{d_+}}{e^{d_+} + e^{d_-}},$$

$$d_+ = 2(1 - \min((S_+ + M_+), 1),$$

-continued $$d_- = 2(1 - \max((S_+ + M_{-1}, 0)),$$

$$S_+ = \frac{1}{2}(1 + \cos(EVx_i, EVx_i^+)),$$

$$S_- = \frac{1}{2}(1 + \max_{n=1:N}(\cos(EVx_i, EVx_n^-))),$$

$x_n^-$ is the n-th one of the N negative speech samples fed during the N iterations, $EVx_i$ is the first network output responsive to one of the first set of speech samples, $EVx_i^+$ is the second network output responsive to one of the second set of speech samples, $EVx_i^-$ is the third network output responsive to the negative speech sample $$x_n^-, M_+ = \frac{1 - \cos\left(\frac{\pi}{4}\right)}{2}, M_- = \frac{1 - \cos\left(\frac{3\pi}{4}\right)}{2},$$

and K is a constant.

According to an alternative exemplary embodiment, the loss function may be related to the Equal Error Rate (EER) metric. In this case, the loss function could be defined as $$\text{Loss} = e^{\frac{\mu_+ - \mu_-}{(\sigma_+ + \sigma_-)\sqrt{2}}},$$

where $\mu_+$ and $\sigma_+$ are the mean and standard deviation of positive recognition scores based on a Gaussian distribution, and $\mu_-$ and $\sigma_-$ are the mean and standard deviation of negative recognition scores based on a Gaussian distribution.

According to an exemplary embodiment, each of the feed-forward neural networks employed in the triplet network architecture may include at least one convolutional layer at least one max-pooling layer, and a fully connected layer.

Furthermore, in one exemplary embodiment, the present invention can be used to perform a speaker verification task in which the user inputs a self-identification, and the recognition speech sample is used to confirm that an identity of the user is the same as the self-identification. In another exemplary embodiment, the present invention can be used to perform a speaker identification task in which the recognition speech sample is used to identify the user from a plurality of potential identities stored in association with respective speech samples. The aforementioned embodiments are not mutually exclusive, and the same triplet neural network may be used to perform both tasks.

BRIEF DESCRIPTION OF THE DRAWINGS

FIG. 4 illustrates a flowchart of a general process for speaker recognition according to an exemplary embodiment of the present invention.

DETAILED DESCRIPTION

A more detailed description of the invention will now be provided in reference to the accompanying drawings.

Exemplary embodiments of the present invention are directed to a system and method utilizing a deep neural network (DNN) having a triplet network architecture, to conduct text-independent speaker recognition. The terms "deep neural network" and "DNN" refer to a neural network with multiple hidden layers, composed of multiple linear and non-linear transformation functions. In this application, two subtasks of speaker recognition are considered: verification and identification. For purposes of this application, "verification" refers to the task of detecting if the actual speaker is whom he/she claims to be, while "identification" refers to the task of retrieving the identity of the speaker from a predetermined list of speakers. Principles of the present invention described hereinbelow can be applied to either or both of these subtasks. Also, in this application, the term "user" will sometimes be used to refer to a particular speaker for whom the DNN is trained to recognize.

The use of a DNN to perform speaker recognition is advantageous over other approaches that utilize a universal background model (UBM) estimated using a Gaussian mixture model (GMM), because a DNN is better at representing low-level features and mapping them to high-level features. The low-level features could be as low as the raw speech signal. The high-level features are the voiceprints that preserve the total variability of the speech signal. As such, the voiceprint extracted by a DNN may resemble an i-vector obtained by the UBM/GMM, but gives superior results.

Figure 1:
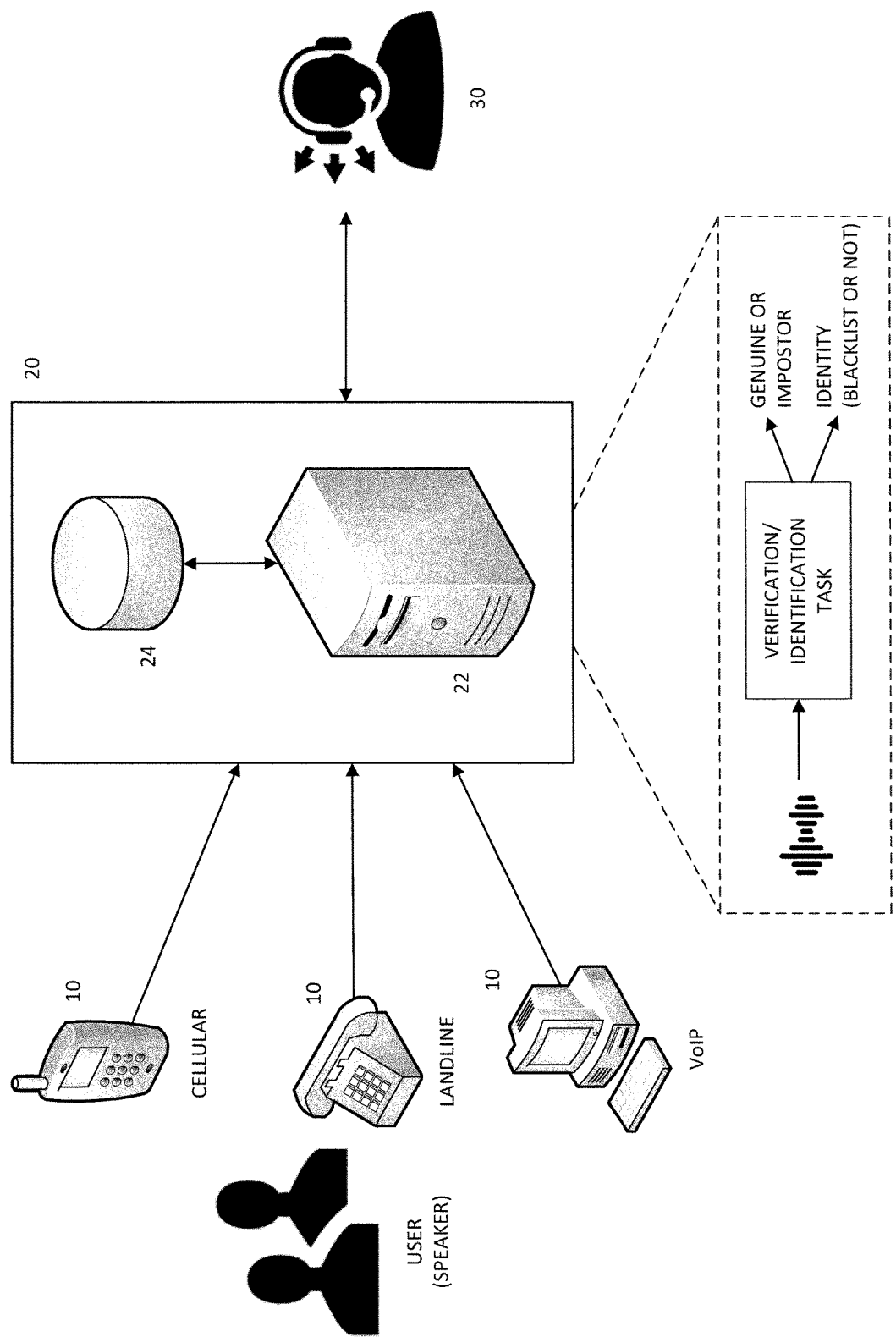
FIG. 1 illustrates a system for performing speaker recognition according to an exemplary embodiment of the present invention.

FIG. 1 illustrates a system for performing speaker recognition according to an exemplary embodiment of the present invention. According to FIG. 1, a user or speaker may speak an utterance into input device 10 containing a microphone for converting the uttered sound into an electrical signal. As particularly shown in FIG. 1, the input device 10 may be a device capable of telecommunications, such as a telephone (either cellular or landline) or a computer or other processor based device capable of voice over internet (VoIP) communications. In fact, it is contemplated that the present invention could be utilized specifically in applications to protect against telephone fraud, e.g., verifying that the caller is whom he/she claims to be, or detecting the caller's identity as somebody on a "blacklist" or "blocked callers list."

According to FIG. 1, the user's utterance, which is used to perform speaker identification, will be referred to in this specification as the "recognition speech sample." The recognition speech sample may be electrically transmitted from the input device 10 to a speaker recognition subsystem 20. Although it is contemplated that the input device 10 into which the recognition speech sample is spoken may be a telecommunication device (e.g., phone), this need not be the case. For instance, the input device 10 may simply be a microphone located in close proximity to the speaker recognition subsystem 20.

The speaker recognition subsystem 20 of FIG. 1 may include a computing system 22, which can be a server or a general-purpose personal computer (PC), programmed to model a deep neural network having a triplet network architecture (details of which will be described in more detail below). It should be noted, however, that the computing system 22 is not strictly limited to a single device, but instead may comprise multiple computers and/or devices working in cooperation to perform the operations described in this specification (e.g., training of the DNN may occur in one computing device, while the actual verification/identification task is performed in another). While single or multiple central processing units (CPU) may be used as a computing device for both training and testing, graphics processing units (GPU's) may also be used. For instance, the use of a GPU in the computing system 22 may help reduce the computational cost, especially during training.

As shown in FIG. 1, the speaker recognition subsystem 20 also includes a memory device 24 used for training the DNN in exemplary embodiments. Particularly, this memory device 24 may contain a plurality of sampled speech signals (or "speech samples") from multiple users or speakers, as well as a plurality of registered voiceprints obtained for users who have been "enrolled" into the speaker registration subsystem 20. Particularly, the memory device 24 includes two different datasets corresponding to the respective functions to be performed with respect to the DNN: training and testing.

In regard to the function of training, according to exemplary embodiments of the present invention, the DNN is trained according to positive samples corresponding to multiple speakers, as well as a number N of negative samples. To conduct training, the memory device 24 will preferably contain a dataset including at least two speech samples obtained as actual utterances from each of the multiple speakers. These speech samples are referred to as "positive speech samples" for the relevant speaker. In the memory device 24, the dataset for training the DNN will also include a number N of "negative speech samples" relative to each of the aforementioned speakers. These negative speech samples correspond to utterances by people who are different than the relevant speaker. In a particular example, 1000 negative speech samples (i.e., N=1000) may be used in connection with each of the multiple speakers used to train the DNN. However, the number N can be higher or lower than 1000. It should also be noted that a speech sample of unknown origin may be used as one of the N negative speech samples, regardless of whether or not it can be confirmed that such speech sample originated from a different speaker i than the one currently used to train the DNN.

The memory device 24 may include another dataset to perform the "testing" function, whereby the DNN performs actual speaker recognition by positively verifying or identifying a user. To perform this function, the dataset need only one positive speech sample of the particular user, which may be obtained as a result of "enrolling" the user into the speaker recognition subsystem 22 (which will be described in more detail below). Further, this dataset may include one or more registered voiceprints, corresponding to each user who can be verified/identified by the system.

Referring again to FIG. 1, the results of the speaker recognition analysis can be used by an end application 30 that needs to authenticate the caller (i.e., user), i.e., verifying that the caller is whom he/she claims. As an alternative, the end application 30 may need to identify any caller who is on a predefined list (e.g., blacklist or blocked callers). This can help detect a malicious caller who spoofs a telephone number to evade detection by calling line identification (CLID) (sometimes referred to as "Caller ID"). However, even though the present invention can be used by applications 30 designed to filter out malicious callers, the present invention is not limited to those types of applications 30. For instance, the present invention can be advantageously used in other applications 30, e.g., where voice biometrics are used to unlock access to a room, resource, etc.

It should be noted that various modifications can be made to the system illustrated in FIG. 1. For instance, the input device 10 may transmit the recognition speech sample directly to the end application 30, which in turn relays the recognition speech sample to the speaker recognition subsystem 20. In this case, the end application 30 may also receive some form of input from the user representing a self-identification. For instance, in case of performing a speaker identification task, the end application 30 may request the user to identify him or herself (either audibly or by other forms of input), and send both the recognition speech sample and the user's alleged identity to the speech recognition subsystem 20 for authentication. In other cases, the self-identification of the user may consist of the user's alleged telephone number, as obtained by CLID. Furthermore, there is no limitation in regard to the respective locations of the various elements illustrated in FIG. 1. In certain situations, the end application 30 may be remote from the user, thus requiring the use of telecommunications for the user to interact with the end application 30. Alternatively, the user (and the input device 10) may be in close proximity to the end application 30 at the time of use, e.g., if the application 30 controls a voice-activated security gate, etc.

Figure 2A:
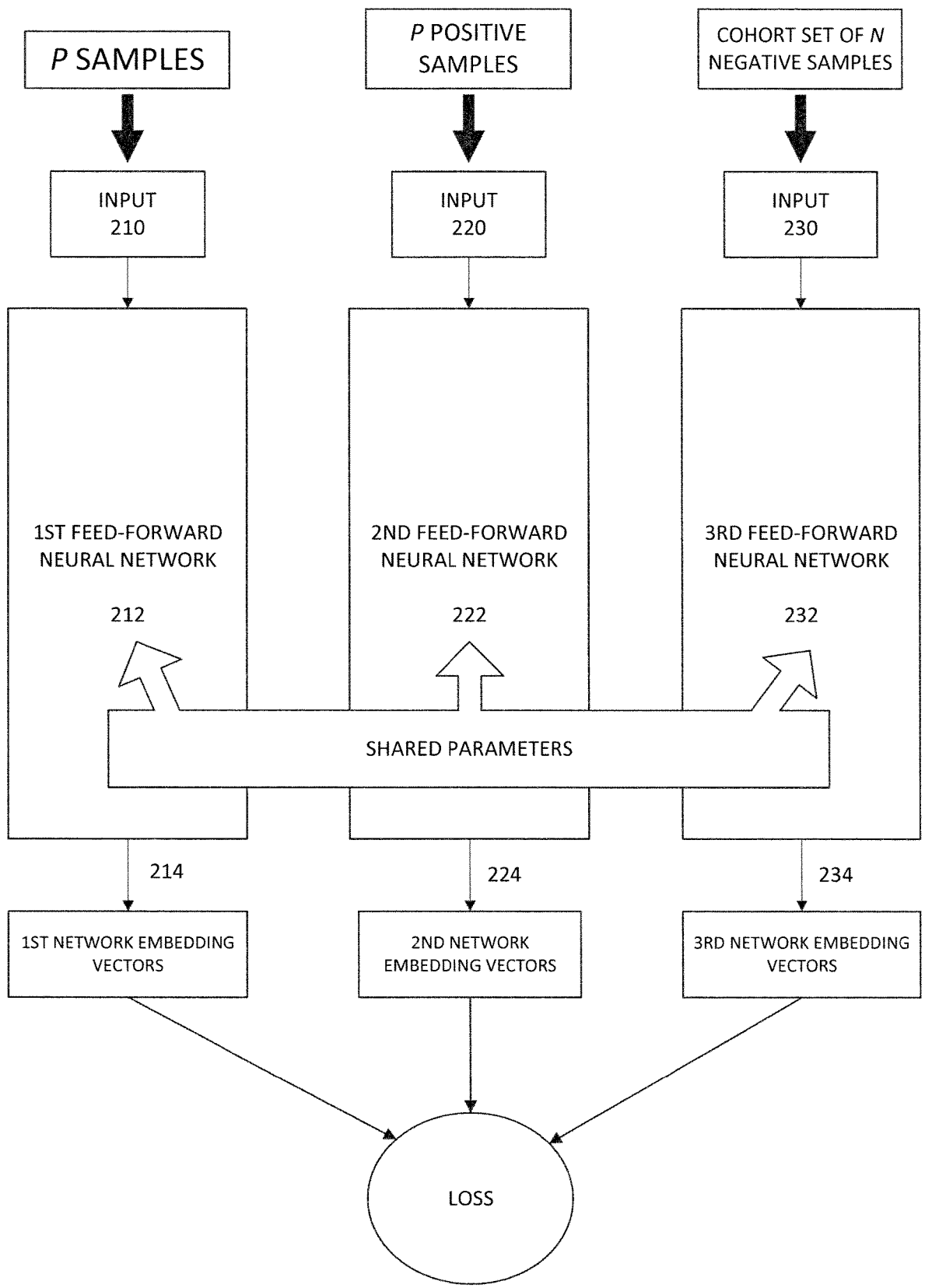
FIG. 2A illustrates a general structure of a deep neural network having a triplet network architecture for use in training, according to exemplary embodiments of the present invention.

FIG. 2A illustrates a general structure of a deep neural network (DNN) having a triplet network architecture for use during training, according to exemplary embodiments of the present invention. Also, FIG. 2A illustrates conceptually the use of a batch process in which P audio samples, their corresponding P positive samples, and a cohort set of N negative speech samples are used to train the first, second, and third feed-forward neural networks.

In FIG. 2A, the DNN consists of three instances of the same feed-forward neural network 212, 222, and 232, which share the same parameters. Having shared parameters (as indicated in the figure), the three feed-forward neural networks 212, 222, 232 are identical in the number and configuration of layers, the connection weights between layers, etc. These feed forward neural networks 212, 222, 232 are provided with three different samples via inputs 210, 220, 230, respectively. Particularly, as the DNN is being trained, the DNN may perform a batch processing whereby the first feed-forward neural network 212 and the second feed-forward neural network 222 are fed with a set of P speech samples, each designated as $x_i$ (i=1, P), and a corresponding set of P positive speech samples, each designated as $x_i^+$, via respective inputs 210 and 220. These two sets of speech samples are spoken by (and thus attributed to) the same speaker. Further, the third feed-forward neural network 232 is fed a common cohort set of negative speech samples $x_1^-$, ... $x_N^-$ via input 230 during the batch processing. The negative speech samples in the cohort set are not spoken by (or at least not known to be spoken by) the same speaker as the aforementioned sets of P samples, and thus are not attributed to the same speaker. The output 214 of the first feed-forward neural network 212 produces a first set of P embedding vectors responsive to the samples $x_i$, and the output 224 of the second feed-forward neural network 222 produces a second set of P embedding vectors responsive to the samples $x_i^+$. Also, the output 234 of the third feed-forward neural network 232 produces a third set of N embedding vectors responsive to the negative speech samples in the cohort set. After a given batch is processed, these embedding vectors are used to compute a loss (which will be described in more detail below), and the loss is used to modify connection weights in the three feed-forward neural networks 212, 222, 232 according to a back-propagation technique.

Figure 2B:
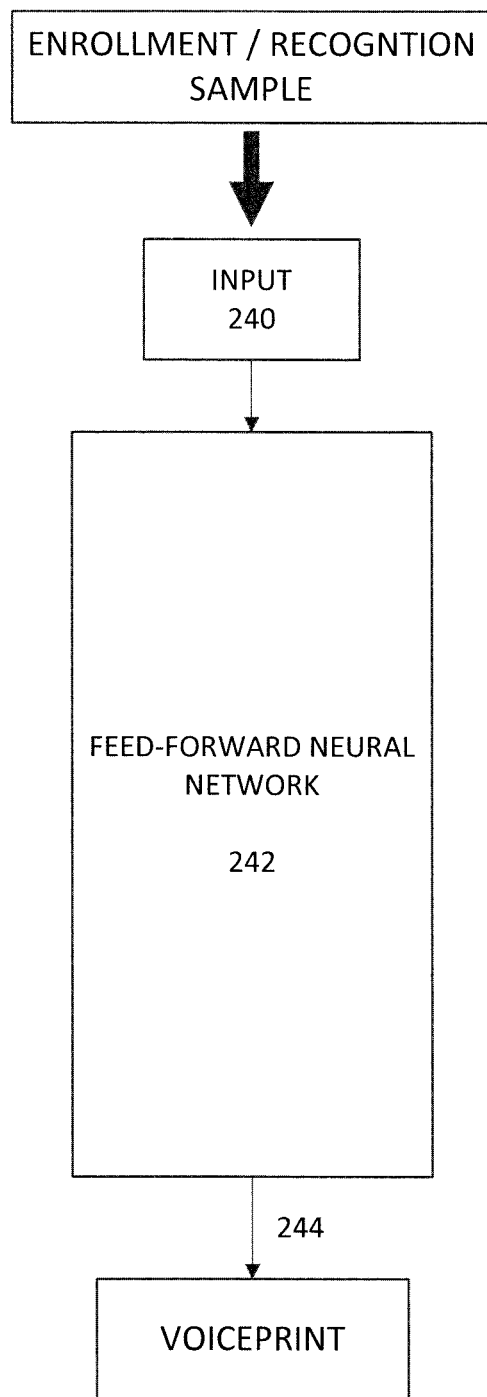
FIG. 2B illustrates a general structure of a deep neural network having a triplet network architecture for use in enrollment and testing for a particular user, according to exemplary embodiments of the present invention.

Furthermore, as shown in FIG. 2B, another feed-forward neural network 242 is used to perform actual speaker recognition based on the recognition speech sample inputted by the user (via input device 10) after training of the DNN is complete. Since the first, second, and third feed-forward neural networks 212, 222, 232 incorporate shared parameters, and thus are identical to one another when training of the DNN is complete, any one of these three feed-forward neural networks may be used interchangeably as the feed-forward neural network 242 that performs speaker recognition. Alternative, a new instance of a feed-forward neural network, incorporating the parameters shared among the three feed-forward neural networks 212, 222, 232 may be used as the feed-forward neural network 242 of FIG. 2B for use in enrolling and/or testing (speaker recognition) of a user. The enrollment and testing performed in accordance with this feed-forward neural network 242 will be described in more detail below.

Now, additional details will be provided on the design of the DNN. As will be discussed below, aspects of a convolutional neural network (CNN) may be combined with those of a DNN by incorporating at least one convolutional layer into each of the first, second, and third feed-forward neural networks 212, 222, 232. Further, each convolutional layer has neurons in three dimensions: height, width, and depth.

Figure 3A:
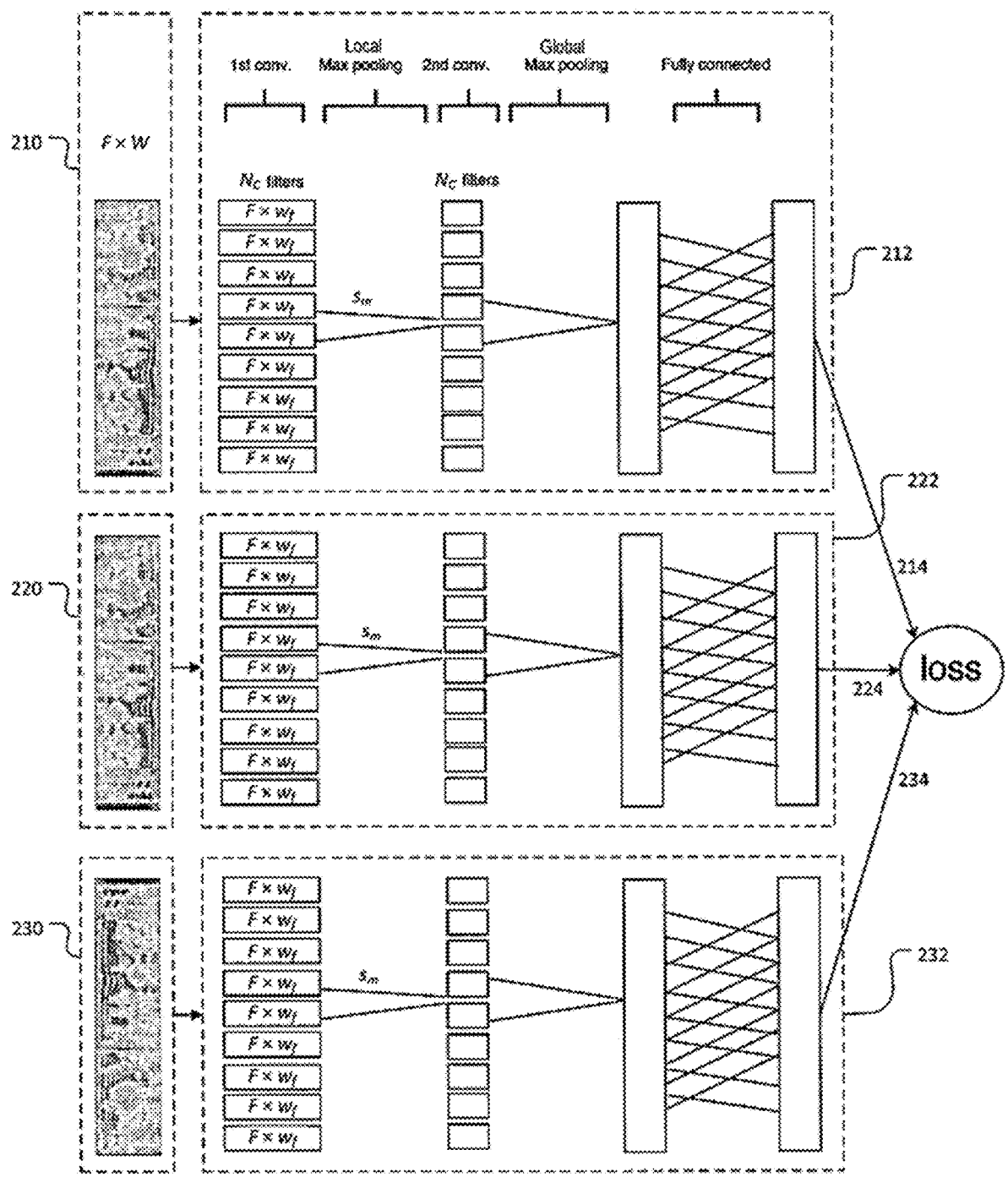
FIG. 3A illustrates a specific example of the structure of a deep neural network with a triplet network architecture, designed to receive pre-processed speech samples, for use in training.

FIG. 3A illustrates a specific example of the structure of a DNN with a triplet network architecture for use in training the DNN. As shown in FIG. 3A, each of the first, second, and third feed-forward neural networks 212, 222, 232 may comprise a first convolutional layer connected to a max-pooling layer, a second convolutional layer followed by a second max-pooling layer, a subsequent fully connected layer, and an output layer which comprises the embedding vector. Upon conclusion of training, however, the output layer of each of the feed-forward neural networks 212, 222, 232 will be configured to produce a feature representation (i.e., voiceprint) of the inputted sample.

Also shown in FIG. 3A are the respective inputs 210, 220, 230 of the first, second, and third feed-forward neural networks 212, 222, 232. According to an exemplary embodiment, prior to being inputted into a respective one of the feed-forward neural networks 212, 222, 232, each of the speech samples (including the speech sample $x_i$, the positive speech samples $x_i^+$, and the negative speech sample $x_n^-$) may be preprocessed so as to generate an "image" of the corresponding utterance. Such preprocessing may include applying voice activity detection in order to discard a non-speech part of the signal. The preprocessing may also include partitioning the underlying speech signal into a certain number (W) of overlapping windows, and extracting a certain number (F) of features (e.g., Mel filterbank features) from each of the W overlapping windows. A specific example of such pre-processing, which is not to be construed as limiting the claims, will now be described. In this non-limiting example, image may be generated for each speech sample by partitioning the underlying speech signal into windows of a 20-millisecond duration, with an overlap (or window shift) of 10 milliseconds. Further, the image for each sample may include 500 of the aforementioned overlapping windows (W=500), with 40 Mel filterbank features (F=40) being extracted from each window (thereby resulting in an image of a size 40×500 in each of the inputs 210, 220, 230). This would correspond to a speech sample with a duration of 5 seconds (with the 40-dimensional feature vector being extracted every 10 milliseconds). However, this is merely an example, and it should be noted that different utterance durations, different numbers of windows, and different numbers and types of features may be used. In other words, different types of speech "images" may be applied to the DNN.

It should be noted that the aforementioned preprocessing may be performed either before or after relevant speech samples are stored in the memory device 24. It is also contemplated that the device 10 that inputs the recognition speech sample from the user, and other types of speech transmitting/recording devices that are used for inputting the positive and negative speech samples, may be configured to perform some or all of the operations of the aforementioned preprocessing.

Referring again to FIG. 3A, assuming that input signal is a preprocessed image of a size F×W as described above, the first convolutional layer of each of the first, second, and third feed-forward neural networks may comprise an appropriate number ($N_c$) of convolutional filters to process such an image. Further, each convolutional filter in this layer may be configured to process the features of a corresponding window, and thus have a size of F×$w_f$ neural units (or "neurons"). As such, each convolutional filter would have a height commensurate with the number of features F, and a width ($w_f$) that can be chosen based on various considerations (e.g., to account for dynamics of speech, to meet processing and memory requirements, etc.).

A specific non-limiting example of the configuration of the first convolutional layer in the feed-forward neural networks 212, 222, 232 of FIG. 3A will now be described. For purposes of this example, it can be assumed that the inputted image is preprocessed with a size (F×W) of 40×500 as mentioned above in connection with the previous non-limiting example regarding preprocessing (corresponding to 5 seconds of speech, with a 40-dimensional feature vector extracted every 10 milliseconds). In this case, the first convolutional layer of each of the first, second, and third feed-forward neural networks may comprise 256 convolutional filters ($N_c$=256), each filter having a height of 40 neurons (corresponding to the 40 features extracted from each window), and a width ($w_f$) not exceeding 5 neurons (e.g., 1 or 3 neurons). In this case, the depth of the first convolutional layer in FIG. 3A would be 256, the height of this layer would be 40, and the width of the layer would be $w_f \leq 5$. Also, in this non-limiting example, the entry neurons in the first convolutional layer could be connected to multiple windows of the input image.

It should be noted that the above is a non-limiting example, and that the depth and height dimensions of the first convolutional layer may differ from the aforementioned 256 and 40, respectively. In this case, however, it is suggested that the depth (i.e., the number of convolutional filters $N_c$) would preferably be less than or equal to the number of overlapping windows in the inputted image, while the height would preferably be equal to the number of features (e.g., Mel filterbank features) extracted from each of the windows during preprocessing of the relevant speech sample.

Referring again to FIG. 3A, subsequent to the first convolutional layer in each of the feed-forward neural networks 212, 222, 232, a one-dimensional max-pooling layer of a size $S_m$, is provided. A max-pooling layer is a layer that computes a maximum value from a temporally input sequence. In FIG. 3A, the results of the max-pooling layer are provided to a second convolutional layer, comprised of $N_c$ convolutional filters. However, the size of these filters is not necessarily the same as those in the first convolutional layer. In a non-limiting example, the height and width of this second convolutional layer may be 1. Furthermore, according to FIG. 3A, a final global max-pooling layer is applied across the entire time axis, to make the resulting embedding vector less sensitive to the duration of the inputted image. The next layers are a fully connected layer and output layer, e.g., each with $N_c$ neurons. The output layer provides the embedding vector during training, but after training is configured to produce the feature representation, i.e., the voiceprint or voice signature of the speaker who originated the sample. Specifically, the output layers of the respective first, second, and third feed-forward neural networks 212, 222, 232 are what were previously referred to as the first, second, and third networks outputs 214, 224, 234 of the DNN.

For instance, during training, when the image of a speech sample $x_i^+$ is fed through the first feed-forward neural network 212, the first network output 214 produces a result which may be symbolized as $EVx_i$, which stands for the embedded vector for $x_i^+$. Similarly, when the image of a positive speech sample $x_i^+$ is fed through the second feed-forward neural network 222, the second network output 224 produces a result which may be symbolized as $EVx_i^+$, which stands for the embedded vector for $x_i^+$. Similarly, when the image of a negative speech sample $x_n^-$ is fed through the third feed-forward neural network 232 (with n being an arbitrary integer between 1 and N), the third network output 234 produces a result which may be symbolized as $EVx_n^-$, which stands for the embedded vector for $x_n^-$.

As shown in FIG. 3A, after a given batch of training samples are processed, a loss function may be calculated based on the respective outputs 214, 224, 234 of the first, second, and third feed-forward neural networks 212, 222, 232. The computed loss function may be used to train the respective neural networks 212, 222, 232 of the DNN using a backpropagation algorithm with a "stochastic gradient descent" optimizer, which aims at computing the gradient of the loss function with respect to all the weights in the DNN. The goal of the optimizer is to update the weights, in order to minimize the loss function. However, it is also contemplated that other types of backpropagation algorithms may be used. In the example of FIG. 3A, the loss function can be used to update the connection weights in each of the first convolutional layer, the second convolutional layer, and the fully connected layer. More details regarding the training algorithm will be discussed below in connection with FIG. 6.

Figure 3B:
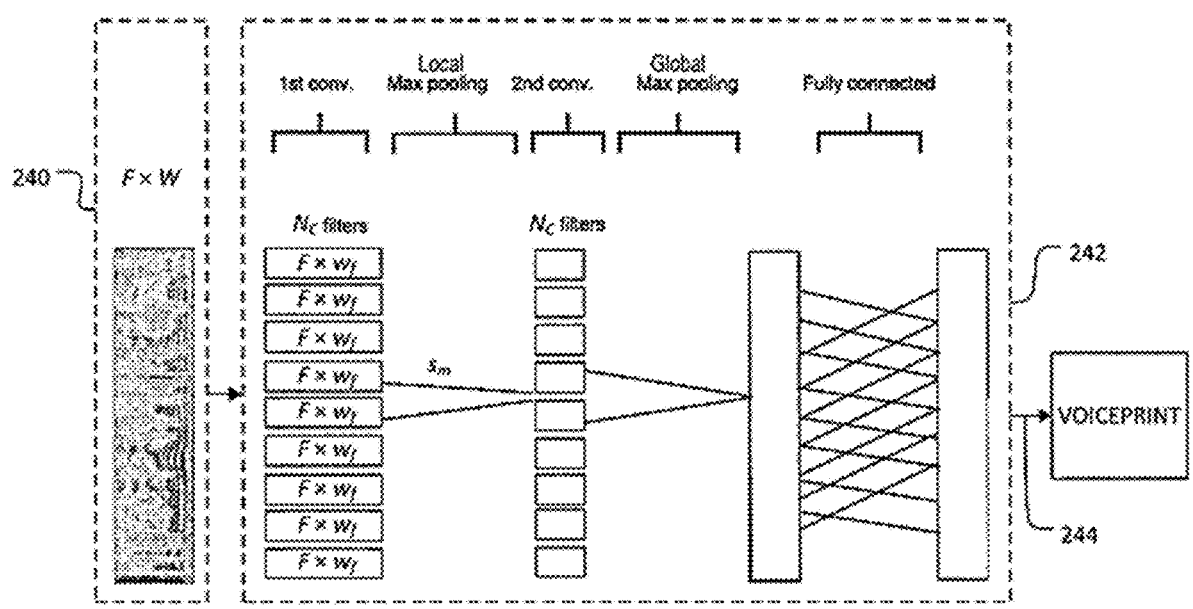
FIG. 3B illustrates a specific example of the structure of a deep neural network architecture for use in enrollment and testing for a particular user.

Now, reference will be made to FIG. 3B, which illustrates a specific example of a DNN architecture for use in enrollment and testing for a particular user. Particularly, FIG. 3B illustrates a feed-forward neural network 242 for performing the enrollment and testing functions. As mentioned above in connection with FIG. 2B, the configuration and parameters of the feed-forward neural network 242 in FIG. 3B will share the same configuration and parameters as each of the first, second, and third feed-forward neural networks 212, 222, 232 after the DNN of FIG. 3A has been trained. As such, at the conclusion of training, any one of the first, second, and third feed-forward neural networks 212, 222, 232 may be used as the feed-forward neural network 242 of FIG. 3B, or a new instance of a neural network incorporating the shared parameters and configuration may be used.

As shown in FIG. 3B, the neural network 242 may receive at its input 240 an image generated by preprocessing of a speech sample. Depending on whether enrollment or testing is being performed, the inputted image will correspond either to a speech sample inputted for the purpose of enrolling or registering a particular user (i.e., an "enrollment speech sample"), or a speech sample upon which speaker recognition is to be conducted (i.e., a "recognition speech sample"). Once the inputted image is fed through the feed-forward neural network 242, the output layer 240 will produce a corresponding feature presentation (i.e., voiceprint). Each feature representation produced by the output layer 240 may resemble an i-vector, but is designed to better represent the low-level features in the speaker's voice since they were produced by a DNN.

Figure 3C:
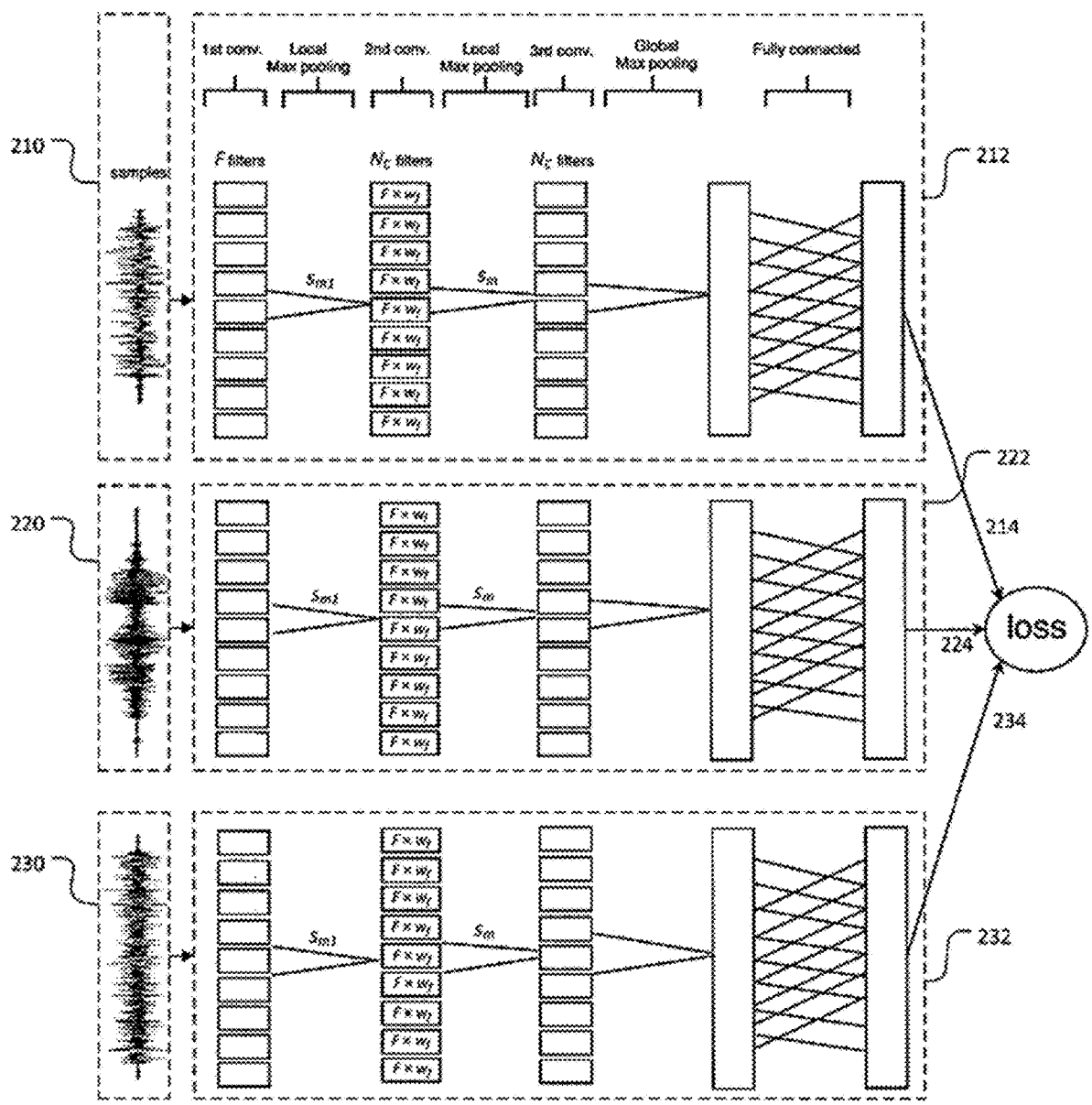
FIG. 3C illustrates another specific example of the structure of a deep neural network with a triplet network architecture, designed to process raw speech samples, for use in training.

As mentioned above, the example DNN architecture in both FIG. 3A and FIG. 3B is based on the assumption that each inputted speech sample is preprocessed as an image. However, this need not be the case. For instance, the DNN may take on a different triplet network architecture that FIG. 3C illustrates an example of a deep neural network with a triplet network architecture for processing raw speech samples as inputs. Particularly, as shown in FIG. 3C, the speech samples received at the respective inputs 210, 220, and 230 of the respective feed-forward neural networks 212, 222, and 232 are not preprocessed in the manner described above in connection with FIG. 3A and FIG. 3B. Instead, each inputted sample constitutes a signal obtained by sampling the raw speech signal (e.g., as inputted via an input device 10) to obtain a sequence of samples. Further, as shown in the particular example of FIG. 3C, each of the first, second, and third feed-forward neural networks 212, 222, 232 includes an additional convolutional layer and local max-pooling, which are positioned in front of other layers that are analogous to ones described in connection FIG. 3A. The added convolutional layer of FIG. 3C, which is shown as receiving the raw speech sample, is comprised of a number (F) of convolutional filters corresponding to the number of features to be extracted from the raw speech sample. The added max-pooling layer may be a one-dimensional layer of a size $S_{ml}$. These additional layers may be configured to apply transformations that are analogous to the preprocessing described above in connection with FIG. 3A and FIG. 3B.

Now, reference will be made to FIG. 4, which illustrates a flowchart of a general process 400 for speaker recognition according to an exemplary embodiment of the present invention. According to operation S410 in this figure, a DNN with a triplet network architecture is trained. For conducting speaker recognition on a particular user, it is contemplated that the DNN will be trained on the basis of at least one positive speech sample obtained from the user, in combination with multiple negative speech samples obtained from other speakers (and, possibly, an unknown speaker). As illustrated FIG. 4, the speech samples used for training the DNN may be extracted from storage in the memory device 24. After the DNN is trained, a particular user can be registered or enrolled by the speaker registration subsystem 20 in operation S420. This means that a "speaker model" may be generated for the particular user, for purpose of future comparison with a feature representation or voiceprint of the same user to perform speaker verification. Thereafter, a recognition speech sample is obtained in operation S430. The recognition speech sample may be obtained, e.g., from the input device 10. In operation S440 of FIG. 4, the recognition speech sample is fed through the DNN (i.e., neural network 242), and the output of the DNN responsive to the recognition speech sample is used in operation S450 (along with the aforementioned speaker model) to perform speaker recognition, i.e., either verify or identify the user on the basis of the DNN output.

Figure 5:
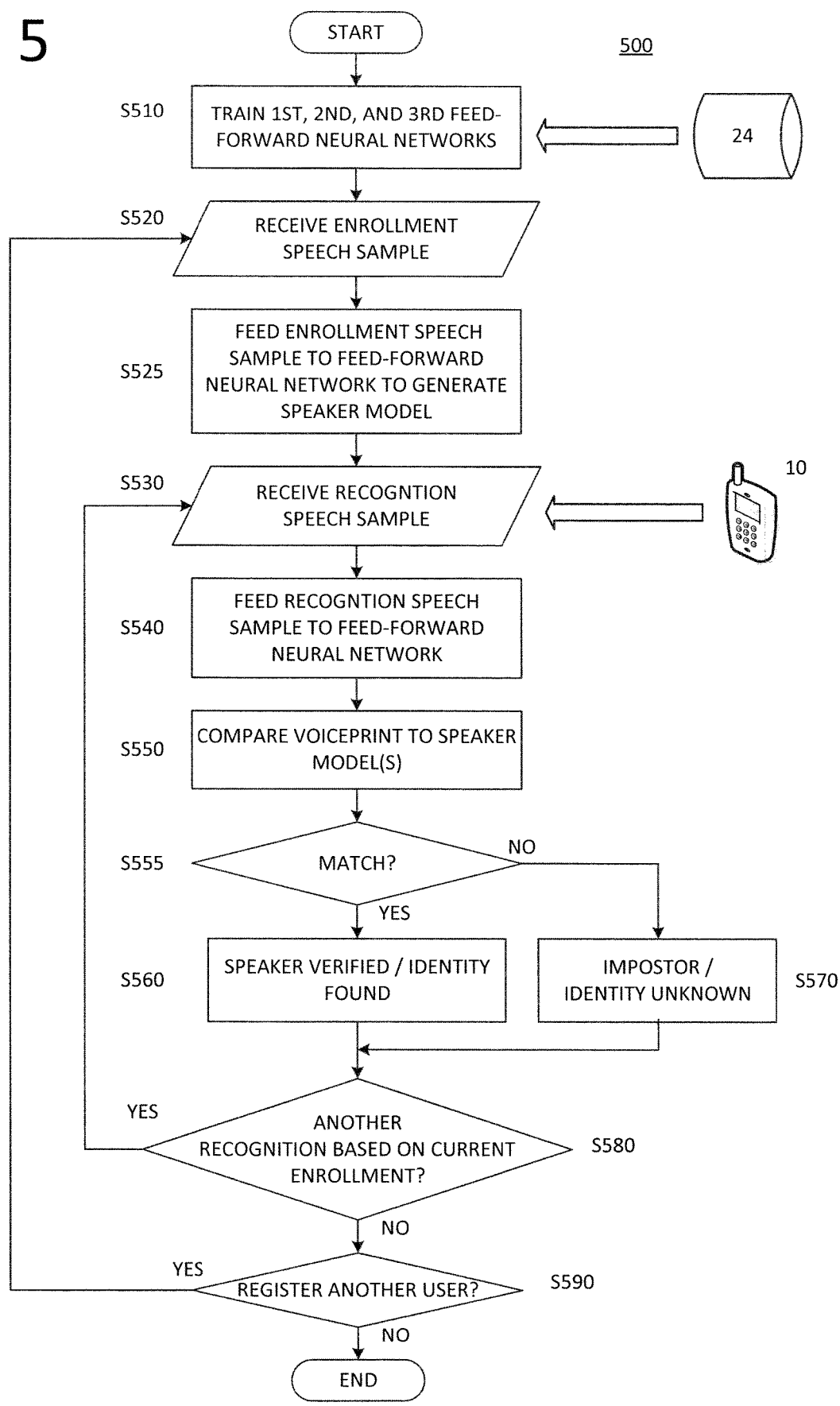
FIG. 5 illustrates a flowchart of a process of utilizing a deep neural network of triplet network architecture to perform speaker recognition, according to an exemplary embodiment of the present invention.

FIG. 5 illustrates a flowchart of a more specific process 500 for conducting speaker recognition on a particular user, according to an exemplary embodiment of the present invention. In operation S510 of FIG. 5, the DNN, which comprised of the first, second, and third feed-forward neural networks 212, 222, 232, is trained by the computer system 22 using speech samples stored in the memory device 24. Exemplary embodiments of this training process will be described in more detail in connection with FIG. 6. It should be noted that the memory device 24 may contain a bank of speech samples useful for training the DNN in batches corresponding to a plurality of different users. Therefore, training the DNN, according to S510, may include any necessary steps for sorting and extracting speech samples in the memory device 24 according to speaker.

After the DNN is trained as a result of S510, the computer system 22 is operable to use the DNN to perform speaker recognition in regard to a list of registered (or enrolled) users. This means that the DNN can perform verification by determining whether a speaker, who claims to be one of the registered (enrolled) users, is in fact whom he/she claims to be. It also means that the DNN can identify an anonymous speaker if he/she is actually on the list of registered (enrolled) users, and if the speaker is not on this list, indicate that the speaker is unknown. As such, in exemplary embodiments of the present invention, a speaker model is generated for each user who is enrolled or registered. A particular example of generating such a speaker model, in order to enroll a particular user is disclosed in connection with operations S520 and S525 of FIG. 5.

In operation S520 of FIG. 5, the enrollment of a particular user is initiated by receiving a corresponding enrollment speech sample (i.e., a speech sample actually uttered by the particular user). In operation S525, the enrollment speech sample is feed through the feed-forward neural network 242 (as described above in connection with FIG. 2B and FIG. 3B) in order to output a corresponding voiceprint (or feature representation). The voiceprint produced by the feed-forward neural network 242 may be subsequently stored in memory device 24 and used as a speaker model for the registered user. Also, it is possible that more than one enrollment speech sample from a user may be received, and used to register that user. In this case, the multiple enrollment samples can be fed through the feed-forward neural network 242 in order to produce multiple voiceprints for the user. In this case, a mean vector can be computed from the multiple voiceprints, and used as a speaker model for the user.

Operations S520 and S525 of FIG. 5 describe an example of the "enrollment" functionality of a DNN, according to an exemplary embodiment. However, it is not a requirement of the present invention that a DNN be used, in the aforementioned manner, to generate the speaker models for the registered users.

According to the sequence of operations S530 through S560 in FIG. 5, speaker recognition can be performed on a particular user. As such, these operations correspond to the "testing" functionality of a DNN according to exemplary embodiments of the present invention.

In S530 a recognition speech sample is received from the user via the device 10.

This recognition speech sample is then fed into the feed-forward neural network 242 in operation S530, and in response this feed-forward neural network 242 produces at the network output 244 a feature representation or voiceprint of the user's recognition speech sample.

In operation S540 of FIG. 5, the voiceprint or feature representation, which is outputted by the feed-forward neural network 242 in response to the recognition speech sample, is used to verify or identify the user. Particularly, this voiceprint may be compared to one or more speaker models, which were generated according to operation S525 and stored in the memory device 24 in connection with one or more registered users. As mentioned above, each of these speaker models may be a voiceprint similarly produced by the feed-forward neural network 242. According to decision box S550, a decision is made as to whether the voiceprint obtained by the neural network 242 as a result of the recognition speech sample "matches" any of the stored speaker models. Assuming that each speaker model is a similarly-generated voiceprint, this match may be determined according to a measure of similarity (or distance) between the two voiceprints. On the other hand, if each speaker model comprises a different representation of speech features of the corresponding user, a different process may be used in S540 and S550 to compare the voiceprint to respective features of the speaker model and determine whether a match exists.

If S550 decides that a match occurs between the voiceprint of the recognition speech sample, and one of the stored speaker models, the process 500 proceeds to S560 indicating that the identity of the particular user has been authenticated (in a speaker verification task), or that the identity of the particular user has been located in a predefined list or set of known identities (in a speaker identification task). On the other hand, if S550 decides that no match has occurred, the process 500 proceeds to S570 indicating that the particular user is not whom he/she claims to be (and thus is an impostor), or that his/her identity is unknown to the speaker recognition subsystem 20. These results can be outputted by the computing system 22, e.g., on a display and/or audio output of, or the results can be transmitted to another location to be outputted, or otherwise sent and used by the end application 30. For instance, in both speaker verification and identification tasks, an end application 30 may be use the results to permit/deny the user access to a particular resource or path. For instance, the end application 30 could be used to block a user's telephone call when the user is identified as being a member of a blacklist or a blocked caller's list. The application 30 may also be used to automatically flag (or alert authorities about) a user who is lying about his/her identity.

Referring again to FIG. 5, after one speaker recognition task is performed, the DNN may be used to perform another speaker recognition task on a particular sample, based on the current pool of registered users, as illustrated in S580 (with the process 500 returning to S530 to receive a new recognition speech sample). It is also contemplated that another speaker may need to be enrolled, i.e., added to the pool of registered users, for purposes of conducting future speaker recognition tasks. As illustrated in S590, if a new user needs to be enrolled or registered, the process 500 returns to operation S520 whereby a new speaker model is generated.

Next, a more specific description will provided in regard to the process whereby the DNN is trained for each registered user, in accordance with operation S510 of FIG. 5.

Figure 6:
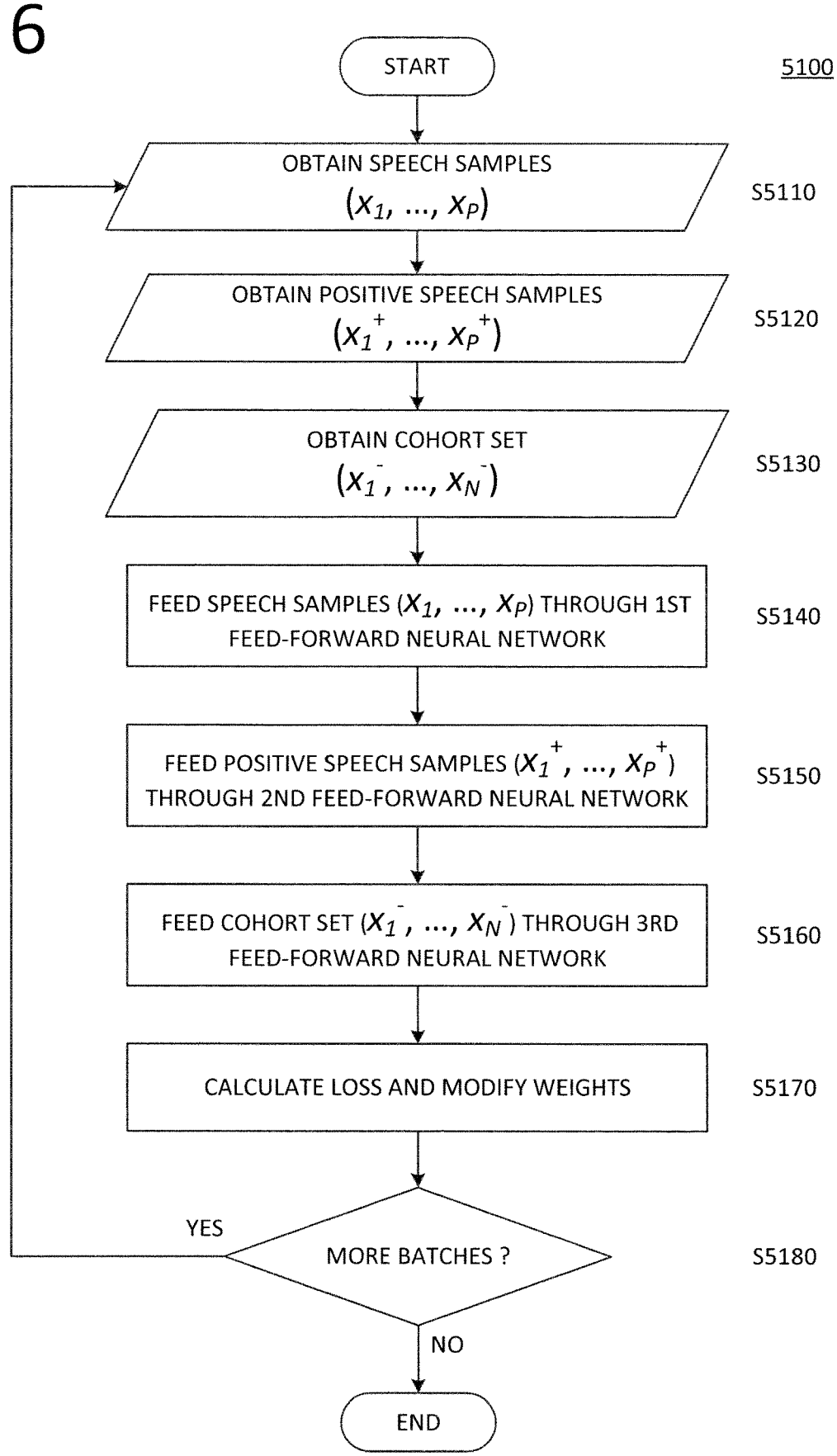
FIG. 6 is a flowchart of a process for training a deep neural network with a triplet network architecture, according to an exemplary embodiment of the present invention.

In particular, FIG. 6 is a flowchart of a process 5100 for training the DNN according to an exemplary embodiment of the present invention. This training of the DNN can be performed according to a batch process, whereby a loss function is computed after a batch of training samples are fed through the DNN. For each batch, a set of P speech samples designated as $x_i$ (i=1, ..., P), all spoken by the same speaker, are sequentially applied through the first feed-forward neural network 212. Also, for each batch, a corresponding set of P positive speech samples $x_i^+$ (i=1, ..., P), all spoken by the same speaker as the $x_i$ samples, are sequentially applied to the second feed-forward neural network 222. As to the third feed-forward neural network 232, a "cohort set" of negative speech samples $x_1^-, x_2^-, \ldots x_N^-$ (which were spoken by a different speaker than the person who spoke the $x_i$ and $x_i^+$ speech samples) are successively inputted into the third feed-forward neural network 232 during each batch. According to a non-limiting example, the number N of negative speech samples in the cohort set (and the number of iterations run for each batch) may equal 1000. However, the cohort set may contain a different number of negative speech samples. It is possible that the same cohort set of negative speech samples can be used for multiple batches, or possibly all batches, during training of the DNN. Also, while it is contemplated that each negative speech sample will be spoken by a different person than the speaker of the $x_i$ and $x_i^+$ speech samples, it is also possible to utilize a speech sample of unknown origin (i.e., the speaker's identity is unknown) as one of the negative speech samples in the cohort set.

Referring to FIG. 6, according to operation S5110, a set of P speech samples $x_i$ from a particular speaker are extracted from the memory device 24. Likewise, in operation S5120, a set of P positive speech samples from the same speaker are also extracted from the memory device 24. The number P of positive speech samples should be at least two, and it is contemplated that P will be more than two. Further, according to operation S5130, the cohort set of N negative speech samples are obtained from the memory device 24.

As mentioned above, the deep neural network (DNN) will perform training in batches such that, in each batch, a set of P speech samples $x_i$ (i=1, ..., P) and a corresponding set of P positive speech samples $x_i^+$ (i=1, ..., P), all originating from the same speaker, are fed through the first and second feed-forward neural networks 212 and 222, respectively. The set of P speech samples $x_i$ (i=1, ..., P) are successively fed through the first neural network 212 in operation S5140, while the set of P positive speech samples $x_i^+$ (i=1, ..., P) are fed through the second feed-forward neural network 222 in operation 5150. In operation S5160, the N negative speech samples in the cohort set are successively fed through the third feed-forward neural network 232.

After a given batch has been processed through the DNN as thus described, operation S5170 is performed. This operation calculates a loss based on the sets of embedding vectors generated as a result of feeding the speech samples $x_i$, the positive speech samples $x_i^+$, and the cohort set $X^{31}$ of negative speech samples $x_1^-, \ldots, x_N^-$ through the DNN. Further, according to S5170, the calculated loss is used to modify the connection weights in each of the first, second, and third feed-forward neural networks 212, 222, 232. In particular, a backpropagation technique utilizing a stochastic gradient descent optimizer may be used to modify the weights once the loss has been calculated. The function for calculating the loss will be described in more detail below.

The loss function, which used for calculating the loss for each batch (i.e., for each set of P speech samples $x_i$ and corresponding set of P positive speech samples $x_i^+$), is based on the following parameters:

- a degree of similarity $S_+$ between the first network output 214 responsive to each speech sample $x_i$ (i.e., the embedding vector $EVx_i$) and the second network output 224 responsive to the corresponding positive speech sample $x_i^+$ (i.e., the embedding vector $EVx_i^+$),
- a degree of similarity $S_-$ between the first network output 214 responsive to each speech sample $x_i$ (i.e., $EVx_i$), and a most similar one of the third network outputs 234 responsive to the cohort set (i.e., the most similar of the feature representations $EVx_1^-, \ldots, EVx_N^-$),
- a positive margin $M_+$ and a negative margin $M_-$ which are respectively applied to the degrees of similarity $S_+$ and $S_-$,
- a positive distance $d_+$ calculated on the basis of the degree of similarity $S_+$ and the corresponding margin $M_+$, and
- a negative distance $d_-$ calculated on the basis of the degree of similarity $S_-$ and the corresponding margin $M_-$ The use of the positive margin $M_+$ and the negative margin $M_-$ help to avoid additional costs in the loss function under the situations where speech samples $x_i$ and $x_i^+$ are reasonably close to one another, and where speech sample $x_i$ is reasonably far from the closest of the negative speech samples.

According to an exemplary embodiment, the loss function for each batch may be defined as follows:

$$\text{Loss} = \sum_{i=1}^{P} L(x_i, x_i^+, X^-) \qquad \text{Equation (1)}$$

where $$L(x_i, x_i^+, X^-) = K \frac{e^{d_+}}{e^{d_+} + e^{d_-}}. \qquad \text{Equation (2)}$$

In Equation (2), K represents a constant (e.g., 1000). Further, the positive and negative distances $d_+$ and $d_-$ in Equation (2) may be calculated according to the following equations:

$$d_+ = 2(1 - \min((S_+ + M_+), 1) \qquad \text{Equation (3)}$$

and $$d_- = 2(1 - \max((S_- + M_- - 1), 0). \qquad \text{Equation (4)}$$

As indicated in Equations (3) and (4), the positive and negative distances $d_+$ and $d_-$ are respectively calculated based on similarities $S_+$ and $S_-$ and corresponding margins $M_+$ and margin $M_-$. These similarities $S_+$ and $S_-$ may be calculated according to the following equations:

$$S_+ = \frac{1}{2}(1 + \cos(EVx_i, EVx_i^+)) \qquad \text{Equation (5)}$$

$$S_- = \frac{1}{2}(1 + \max_{n=1:N} \cos(EVx_i, EVx_n^-)). \quad \text{Equation (6)}$$

In Equation (5), the max operator extracts the one of the feature representations $EVx_1^-, \ldots, EVx_N^-$, produced by the third feed-forward neural network 232 based on the cohort set, which is most similar to the feature representation $EVx_i$.

Also, the positive and negative margins $M_+$ and $M_-$ may be calculated according to the following equations:

$$M_+ = \frac{1 - \cos\left(\frac{\pi}{4}\right)}{2} \quad \text{Equation (7)}$$

and $$M_- = \frac{1 - \cos\left(\frac{3\pi}{4}\right)}{2}. \quad \text{Equation (8)}$$

According to Equations (5) through (8), the similarities ($S_+$ and $S_-$) and the margins ($M_+$ and $M_-$), which are used to determine the respective distances ($d_+$ and $d_-$), are computed in terms of a cosine measure. The use of distances based on a cosine measure, along with the use of positive and negative margins, provide for a robust representation of voiceprints.

Referring again to FIG. 6, when the loss function is calculated for a given batch, the computed loss is used in operation S5170 to modify connection weights in each of the first, second, and third feed-forward neural networks 212, 222, 232 according to, e.g., a backpropagation technique using a stochastic gradient descent optimizer. If, for example, when the DNN has the specific configuration as illustrated in FIG. 3A, the computed loss may be used to modify weights in connection with the first convolutional layer, the second convolutional layer, and the fully connected layer.

It is also noted that a dropout training algorithm may be used, in conjunction with the backpropagation technique, to modify the weights. Particularly, in a dropout algorithm, a certain portion or percentage of the neurons during training are dropped during training in order to prevent modification of their corresponding weights. For instance, the dropout algorithm may be applied so that only 80% (or even just 50%) of the weights are modified as a result of a given batch.

In the process 5100 of FIG. 6, after connection weights of the DNN are modified according to the calculated loss for a given batch according to operation S5170, a determination is made in S5180 as to whether the DNN is to be trained according to any more batches (i.e., different sets of speech samples $x_i$ and positive $x_i^+$ corresponding to different speakers). If there are more batches to be processed, processing returns to operation S5110 to extract the necessary samples and start processing the new batch. Otherwise, in FIG. 6, training for the DNN is considered to be completed.

It should be noted that the flowcharts in FIGS. 4-6 are provided for purposes of illustration only, and are not intended to be limiting on the present invention as defined by the attached claims. The processes disclosed in these figures may be modified and still remain within the spirit and scope of the present invention. For instance, whereas each of these flowcharts illustrates a sequence of operations, the order of these operations may be changed, and certain operations illustrated in these flowcharts may be omitted, while other operations not shown may be added.

Similarly, the structures and configurations illustrated in FIGS. 1, 2A, 2B, and 3A-3C are also provided for purposes of illustration only. The system and neural network configurations illustrated therein may be modified in any manner that is consistent with the spirit and scope of the invention.

Alternative Embodiment

In the above-described embodiments, a DNN with a triplet network architecture is trained to perform both the speaker recognition tasks of verification (detecting if an actual speaker is who he/she claims to be) and of identification (matching the identity of the speaker to someone in a closed set). In such an embodiment, the DNN model for the triplet network architecture may include a structure as illustrated in FIG. 3A and FIG. 3B, and further may be trained according to process shown in FIG. 6. In this case, the parameters of the DNN model for the triplet network architecture may be initialized randomly, prior to training.

However, according to an alternative embodiment, the DNN may be designed specifically for the task of identification, and a different DNN structure and method of training may be employed. For instance, instead of randomly initializing the parameters of the DNN model with the triplet network architecture, the parameters may instead be initialized with those of a DNN specifically trained to perform the speaker identification task on a closed set of speakers, where the output classes are the different speaker labels. Further, during such speaker identification training, the structure of the DNN may be based on that of the feed-forward neural networks 212, 222, 232, 242 illustrated in FIG. 3A and FIG. 3B, but modified with at least two additional layers: (1) a softmax layer, and (2) an output layer including multiple units for the respective speakers in the training set.

For instance, these additional layers may be appended to the feed-forward neural network structure illustrated FIG. 3A and FIG. 3B. As previously described, each of the feed-forward neural networks illustrated in FIG. 3A and FIG. 3B conclude with a fully-connected layer and a subsequent layer for producing an embedding vector or voiceprint. According to the alternative embodiment, this subsequent layer can be transformed into a second fully-connected layer, which feeds the appended softmax layer and output layer. The softmax layer executes a function, which is sometimes referred to as a normalized exponential, and is a generalization of the sigmoid function. The softmax function is used in various probabilistic multi-class classification techniques, including those implemented by artificial neural networks. As to the appended output layer, the number of neural units in this layer is equivalent to number of speakers, which the DNN is trained to identify. For instance, in a non-limiting example where the DNN is trained to perform speaker identification on 3000 different speakers, the output layer would include 3000 different units.

After a DNN (with the appended layers) has been trained to conduct speaker identification on the closed set of speakers, the trained parameters may then be imported into the first, second, and third feed-forward neural networks 212, 222, 232 for subsequent training based on the loss function, e.g., according to the process described above in connection with FIG. 6.

Figure 7:
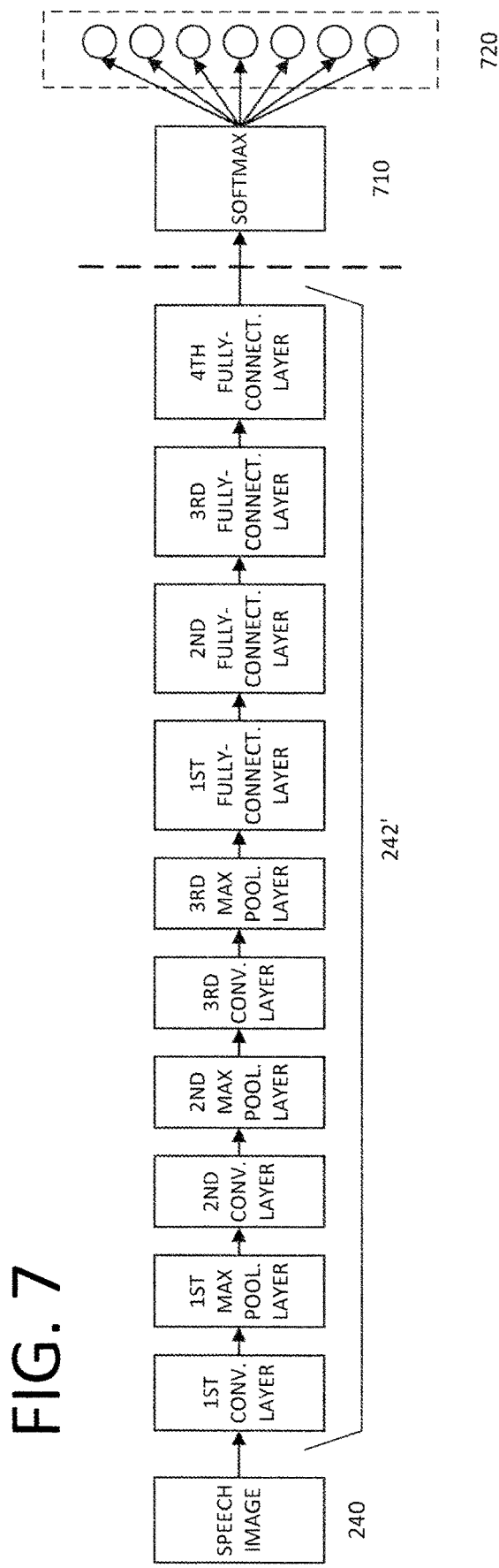
FIG. 7 illustrates an example of the structure of a deep neural network with a triplet network architecture, designed to incorporate the softmax function and be pre-trained to specifically perform speaker identification.

While this alternative embodiment may be based on the structure illustrated in FIG. 3A and FIG. 3B as described above, it is contemplated that other modifications can also be made to the structure of the feed-forward neural networks in this alternative embodiment. For example, FIG. 7 illustrates a specific example of a structure of a DNN that can be used in connection with the alternative embodiment. Using the structure of the feed-forward neural network 242 of FIG. 3B as a reference, FIG. 7 illustrates a feed-forward neural network 242' with a modified structure incorporating three convolutional layers, three max pooling layers, and four fully-connected layers. In FIG. 7, the fourth fully-connected layer is connected to a softmax layer 710, and an output layer 720 comprised of a number of units (equivalent to the number of speakers which the DNN is trained to identify). After the speaker identification training is conducted, the parameters may then be imported into respective feed-forward neural networks according to the triplet network architecture, and trained based on the aforementioned loss function.

Second Alternative Embodiment

It is noted that, in the description of the training process illustrated in FIG. 6, a specific loss function was described above in connection with Equations (1)-(8). However, it is not a requirement that the DNN be trained according to the particular loss function, which was described above in connection with FIG. 6. In an alternative exemplary embodiment, for instance, a different loss function that is directly related to the Equal Error Rate (EER) metric may be used to train the DNN.

The EER metric is typically used to assess the accuracy of a speaker recognition system. In speaker recognition and other biometric systems, an EER is used to pre-determine threshold values for equalizing the false acceptance rate and false rejection rate. The EER is derived under the assumption that the distribution of positive recognition scores (indicating a match) and negative recognition scores (indicating a mismatch) are Gaussian, and can be expressed by the following equation:

$$EER = \frac{1}{2} - \frac{1}{2}\text{erf}\left(\frac{\mu_+ - \mu_-}{(\sigma_+ + \sigma_-)\sqrt{2}}\right). \quad \text{Equation (9)}$$

In Equation (9), the term erf(z) represents the error function, while $\mu_+$ and $\sigma_+$ are the mean and standard deviation of the positive recognition scores, and $\mu_-$ and $\sigma_-$ are the mean and standard deviation of the negative recognition scores. In this case, the positive and negative recognition scores are analogous to the degrees of similarities $S_+$ and $S_-$ mentioned above in connection with the loss function of Equations (1)-(8). As such, the mean and standard deviation of the positive recognition scores ($\mu_+$ and $\sigma_+$), and the mean and standard deviation of the negative recognition scores ($\mu_-$ and $\sigma_-$), can be derived from a batch processing as follows:

$$\mu_+ = \frac{1}{P}\sum_{i=1}^{P} \cos(EVx_i, EVx_i^+) \quad \text{Equation (10)}$$

$$\sigma_+^2 = \frac{1}{P}\sum_{i=1}^{P} [\cos(EVx_i, EVx_i^+) - \mu_i]^2 \quad \text{Equation (11)}$$

$$\mu_- = \frac{1}{N}\sum_{i=1}^{N} \cos(EVx_i, EVx_i^-) \quad \text{Equation (12)}$$

$$\sigma_-^2 = \frac{1}{N}\sum_{i=1}^{N} [\cos(EVx_i, EVx_i^-) - \mu_i]^2 \quad \text{Equation (13)}$$

where symbols P, N, $EVx_i$, $EVx_i^+$, and $EVx_i^-$ have the same meanings as defined above in connection with Equations (1)-(8)).

As shown in Equation (9) above, minimizing the value of EER implies a maximization of the term $$\frac{\mu_+ - \mu_-}{(\sigma_+ + \sigma_-)\sqrt{2}}.$$

Using this logic, a loss function, which is to be minimized during training, may be defined as follows:

$$\text{Loss} = e^{-\frac{\mu_+ - \mu_-}{(\sigma_+ + \sigma_-)\sqrt{2}}}. \quad \text{Equation (14)}$$

Therefore, as an alternative to the loss function described in connection with Equations (1)-(8), a DNN with the triplet network architecture may be trained according to the loss function defined according to Equation (14). However, other loss functions may also be used to train the DNN, and the present invention is not to be limited to a particular loss function.

While particular embodiments have been described above for purposes of example, they are not intended to be limiting on the present invention whose metes and bounds have been defined in the accompanying claims.

What is claimed is:

1. A computer-implemented method comprising:
   training, by a computer, a neural network architecture to generate embedding vectors for speech samples according to a loss function based upon a voiceprint similarity measure that compares the embedding vectors;
   obtaining, by the computer, one or more enrollment speech samples associated with an enrolled speaker;
   generating, by the computer, an enrolled voiceprint for the enrolled speaker based upon executing the neural network architecture on the one or more enrollment speech samples, the neural network architecture generates the enrolled voiceprint as an embedding vector for the one or more enrollment speech samples of the enrolled speaker, wherein the neural network architecture is trained according to a set of positive speech samples and a set of negative speech samples, the loss function decreases as the voiceprint similarity measure for the set of positive speech samples increases and increases as the voiceprint similarity measure for the set of negative speech samples increases;
   obtaining, by the computer, a recognition speech sample associated with a second speaker;
   generating, by the computer, a recognition voiceprint for the second speaker based upon executing the neural network architecture on the recognition speech sample, the neural network architecture generates the recognition voiceprint as the embedding vector for the recognition speech sample;
   generating, by the computer, the voiceprint similarity measure based upon comparing the enrolled voiceprint and the recognition voiceprint, wherein the voiceprint similarity measure indicates a similarity between the second speaker and the enrolled speaker; and
   authenticating, by the computer, the second speaker as the enrolled speaker based on the voiceprint similarity measure.

2. The method according to claim 1, further comprising identifying, by the computer, the second speaker is the enrolled speaker, in response to determining that the voiceprint similarity measure satisfies a recognition similarity threshold.

3. The method according to claim 2, wherein the enrolled voiceprint of the enrolled speaker is associated with a set of fraudulent speakers.

4. The method according to claim 1, wherein the computer obtains a speaker identity claim associated with the recognition speech sample of the second speaker and indicating the enrolled speaker; the method further comprising:
verifying, by the computer, that the second speaker is the enrolled speaker indicated by the speaker identity claim in response to determining that the voiceprint similarity measure satisfies a verification similarity threshold.

5. The method according to claim 1, wherein the neural network architecture is trained by reducing the loss function based upon the voiceprint similarity measure comprising a cosine distance for outputs of the neural network architecture using the set of positive speech samples and the set of negative speech samples.

6. The method according to claim 1, further comprising:
generating, by the computer, one or more training vectors corresponding to a set of one or more positive training speech samples based upon executing the neural network architecture on each of the positive training speech samples;
calculating, by the computer, the loss function based upon the one or more training vectors; and
back-propagating, by the computer, the loss function to modify one or more connection weights in the neural network architecture.

7. The method according to claim 6, wherein the loss function is based upon a positive cosine distance corresponding to the similarity measure between a first training vector and a second training vector.

8. The method according to claim 6, further comprising initializing, by the computer, at least a portion of the neural network architecture with random connection weights.

9. The method according to claim 1, further comprising pre-processing, by the computer, a speech sample prior to executing the neural network, wherein the speech sample is at least one of an enrollment speech sample or the recognition speech sample.

10. The method according to claim 9, wherein generating the enrolled voiceprint includes extracting, by the computer, a set of enrollment features for an enrollment speech sample to be fed into the neural network architecture.

11. A system comprising:
a computer comprising at least one processor, the computer configured to:
train a neural network architecture to generate embedding vectors for speech samples according to a loss function based upon a voiceprint similarity measure that compares the embedding vectors;
obtain one or more enrollment speech samples associated with an enrolled speaker;
generate an enrolled voiceprint for the enrolled speaker based upon executing the neural network architecture on the one or more enrollment speech samples, the neural network architecture generates the enrolled voiceprint as an embedding vector for the one or more enrollment speech samples of the enrolled speaker, wherein the neural network architecture is trained according to a set of positive speech samples and a set of negative speech samples, the loss function decreases as the voiceprint similarity measure for the set of positive speech samples increases and increases as the voiceprint similarity measure for the set of negative speech samples increases;
obtain a recognition speech sample associated with a second speaker;
generate a recognition voiceprint for the second speaker based upon executing the neural network architecture on the recognition speech sample, the neural network architecture generates the recognition voiceprint as the embedding vector for the recognition speech sample;
generate the voiceprint similarity measure based upon comparing the enrolled voiceprint and the recognition voiceprint, wherein the voiceprint similarity measure indicates a similarity between the second speaker and the enrolled speaker; and
authenticate the second speaker as the enrolled speaker according to the voiceprint similarity measure.

12. The system according to claim 11, wherein the computer is further configured to identify the second speaker is the enrolled speaker, in response to determining that the voiceprint similarity measure satisfies a recognition similarity threshold.

13. The system according to claim 12, wherein the enrolled voiceprint of the enrolled speaker is associated with a set of fraudulent speakers.

14. The system according to claim 11, wherein the computer is configured to:
obtain a speaker identity claim associated with the recognition speech sample of the second speaker and indicating the enrolled speaker; and
verify that the second speaker is the enrolled speaker indicated by the speaker identity claim in response to determining that the voiceprint similarity measure satisfies a verification similarity threshold.

15. The system according to claim 11, wherein the neural network architecture is trained by reducing the loss function based upon the voiceprint similarity measure comprising a cosine distance for outputs of the neural network architecture using the set of positive speech samples and the set of negative speech samples.

16. The system according to claim 11, wherein the computer is configured to:
generate one or more training vectors corresponding to a set of one or more positive training speech samples based upon executing the neural network architecture on each of the positive training speech samples;
calculate the loss function based upon the one or more training vectors; and
modify one or more connection weights in the neural network architecture in accordance with the loss function.

17. The system according to claim 16, wherein the loss function is based upon a positive cosine distance corresponding to the similarity measure between a first training vector and a second training vector.

18. The system according to claim 16, wherein the computer is configured to initialize at least a portion of the neural network architecture with random connection weights.

19. The system according to claim 11, wherein the computer is configured to pre-process a speech sample prior to executing the neural network, wherein the speech sample is at least one of an enrollment speech sample or the recognition speech sample.

20. The system according to claim 19, wherein when generating the enrolled voiceprint the computer is configured to extract a set of enrollment features for an enrollment speech sample to be fed into the neural network architecture.

* * * * *